United States Patent
Dorrance et al.

(10) Patent No.: US 11,889,396 B2
(45) Date of Patent: Jan. 30, 2024

(54) DEVICES AND METHODS FOR UPDATING MAPS IN AUTONOMOUS DRIVING SYSTEMS IN BANDWIDTH CONSTRAINED NETWORKS

(71) Applicant: Intel Corporation, Santa Clara, CA (US)

(72) Inventors: Richard Dorrance, Hillsboro, OR (US); Ignacio Alvarez, Portland, OR (US); Deepak Dasalukunte, Beaverton, OR (US); S M Iftekharul Alam, Hillsboro, OR (US); Sridhar Sharma, Palo Alto, CA (US); Kathiravetpillai Sivanesan, Portland, OR (US); David Israel Gonzalez Aguirre, Portland, OR (US); Ranganath Krishnan, Hillsboro, OR (US); Satish Jha, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/720,351

(22) Filed: Apr. 14, 2022

(65) Prior Publication Data
US 2022/0240065 A1 Jul. 28, 2022

Related U.S. Application Data

(62) Division of application No. 16/828,986, filed on Mar. 25, 2020, now Pat. No. 11,375,352.

(51) Int. Cl.
*H04W 4/46* (2018.01)
*G08G 1/01* (2006.01)
*H04W 72/04* (2023.01)

(52) U.S. Cl.
CPC ............ *H04W 4/46* (2018.02); *G08G 1/0141* (2013.01); *H04W 72/04* (2013.01)

(58) Field of Classification Search
None
See application file for complete search history.

(56) References Cited

U.S. PATENT DOCUMENTS

| | | | | |
|---|---|---|---|---|
| 2017/0371349 A1* | 12/2017 | Kim | ................... | G05D 1/0274 |
| 2018/0213376 A1* | 7/2018 | Pinheiro | ............... | H04W 72/30 |
| 2019/0163202 A1* | 5/2019 | Hatano | ............ | G08G 1/096725 |
| 2019/0387379 A1* | 12/2019 | Sugiyama | ............. | H04L 5/0048 |
| 2020/0284591 A1* | 9/2020 | Shapira | ................ | G06V 20/584 |
| 2020/0290631 A1* | 9/2020 | Higuchi | ............... | G05D 1/0285 |

* cited by examiner

*Primary Examiner* — Rebecca E Song
(74) *Attorney, Agent, or Firm* — VIERING, JENTSCHURA & PARTNER MBB

(57) ABSTRACT

A communication device for a vehicle to communicate features about the vehicle's environment includes one or more processors configured to receive a communication from another device, wherein the communication includes a global reference coordinate system for an area covered by the other device and a number of allowed transmissions to be sent from the vehicle; transform stored data about the vehicle's environment based on the global reference coordinate system; divide the transformed stored data into a plurality of subsets of data; and select one or more subsets of data from the plurality of subsets for transmission according to the number of allowed transmissions.

16 Claims, 19 Drawing Sheets

FIG 3
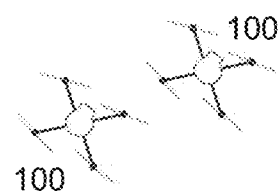
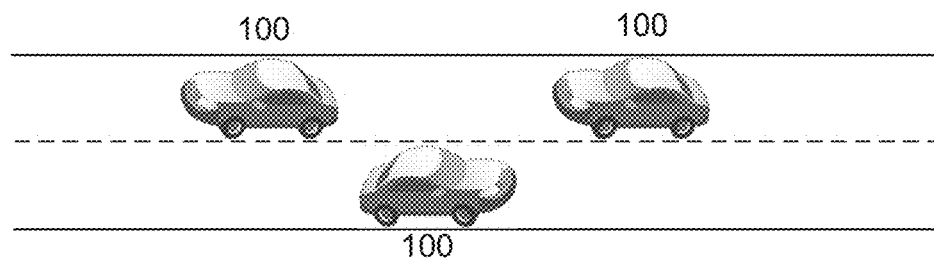
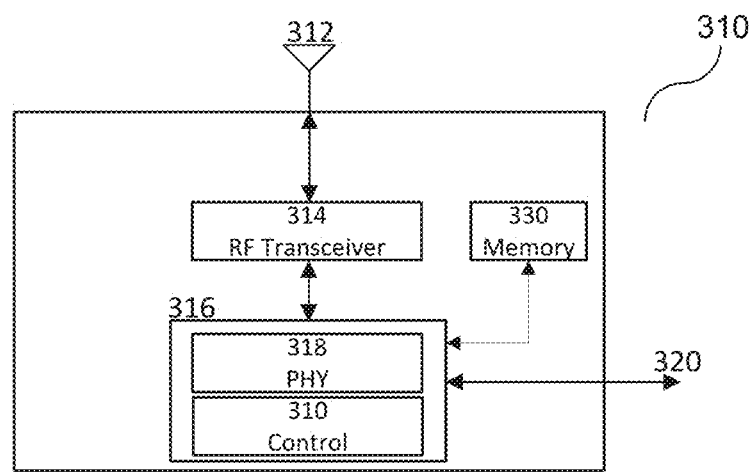

FIG 4
400
  450
440
  430  
420
  410

1602 — Receiving a communication from another device, where the communication includes a global reference coordinate system for an area covered by the other device and a number of allowed transmissions to be sent from the vehicle 1604 — Transforming stored data about the vehicle's environment based on the global reference coordinate system 1606 — Dividing the transformed stored data into a plurality of subsets of data 1608 — Selecting one or more subsets of data from the plurality of subsets for transmission according to the number of allowed transmissions

1802 — Receiving a communication from the clusterhead, where the communication includes a global reference coordinate system for an area covered by the clusterhead and a number of allowed transmissions to be sent from the vehicle 1804 — Transforming stored data about the vehicle's environment based on the global reference coordinate system 1806 — Dividing the transformed stored data into a plurality of subsets of data 1808 — Selecting one or more subsets of data from the plurality of subsets for transmission according to the number of allowed transmissions to at least one other vehicle in the group of vehicles

DEVICES AND METHODS FOR UPDATING MAPS IN AUTONOMOUS DRIVING SYSTEMS IN BANDWIDTH CONSTRAINED NETWORKS

CROSS-REFERENCE TO RELATED APPLICATIONS

This is a divisional application of U.S. Non-Provisional application Ser. No. 16/828,986, which was filed on Mar. 25, 2020, the entire contents of which are fully incorporated herein by reference.

TECHNICAL FIELD

Various aspects of this disclosure generally relate to autonomous driving systems. In particular, aspects of this disclosure relate to mechanisms for generating and updating maps for use in autonomous driving.

BACKGROUND

Autonomous driving utilizes reliable driving control and safety systems that process data acquired at a vehicle. Using data acquired at the vehicle, which may include data about the vehicle's environment or data about the vehicle itself, the vehicle may alter its movements, modify its positioning with respect to external elements, and/or respond to newly detected events. Additionally, autonomous vehicles may be configured to communicate with other devices, such as other vehicles, network infrastructure elements, wireless devices, etc., to assist in the mobility control, provide faster information processing, and, generally speaking, communicate information in order to improve overall system performance.

One of the key features for realizing an efficient and accurate autonomous driving system is the ability to provide and update high-definition (HD) maps. These HD maps may include features that vehicles must account for and respond to in order to safely navigate through their environment. The HD maps may include a static layer providing features which remain largely unaffected over time (e.g. roads, buildings, etc.) and a dynamic layer providing features that are substantially more time-dependent and which must be updated in real-time (e.g., traffic conditions, vehicle accidents, movable obstacles, weather-related conditions, construction, etc.). Accordingly, autonomous driving systems may be largely dependent on maps which provide an accurate depiction of a vehicle's environment in real-time (or as close to real-time as possible) in a network-friendly manner.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 3 shows an exemplary network area according to some aspects.

FIG. 4 shows an exemplary region of a plurality of vehicles (i.e. agents) and feature reporting according to some aspects

FIG. 16-18 show exemplary flowcharts according to some aspects.

DESCRIPTION

Figure 1:
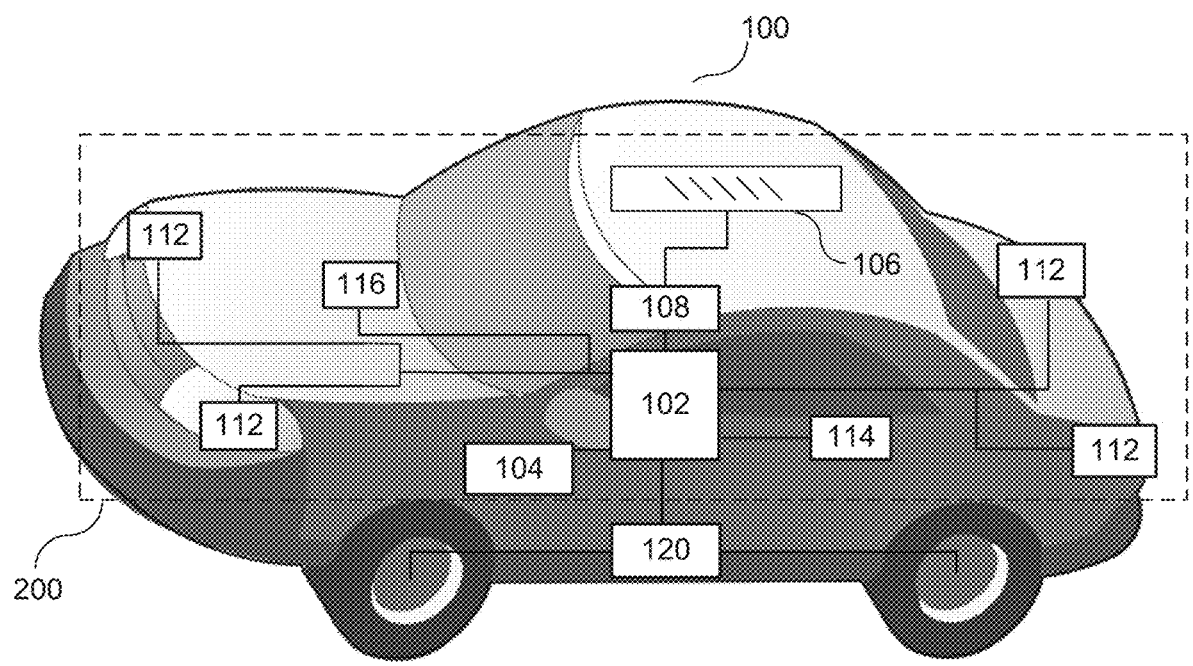
FIG. 1 shows an exemplary autonomous vehicle in accordance with various aspects of the present disclosure.

Autonomous driving systems rely on the accuracy of maps which include features about a vehicle's environment so that a vehicle may safely respond to and/or navigate through its surrounding area. The disclosure herein provides methods and devices which implement mechanisms for communicating features observed about a vehicle's environment to update these maps in order to provide vehicles with accurate and "real-time" maps of its surroundings while taking network resources, such as available frequency-time resources like bandwidth, into consideration.

The following detailed description refers to the accompanying drawings that show, by way of illustration, exemplary details and aspects in which the disclosure may be practiced.

The word "exemplary" is used herein to mean "serving as an example, instance, or illustration." Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.).

The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Accordingly, similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvered on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of an example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects described herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data, and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle in the manners described in this disclosure.

Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

FIG. 1 shows a vehicle 100 including a mobility system 120 and a control system 200 (see also FIG. 2) in accordance with various aspects. It is appreciated that vehicle 100 and control system 200 are exemplary in nature and may thus be simplified for explanatory purposes. For example, while vehicle 100 is depicted as a ground vehicle, aspects of this disclosure may be equally or analogously applied to aerial vehicles such as drones or aquatic vehicles such as boats. Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as an automobile body, drone body, plane or helicopter fuselage, boat hull, or similar type of vehicular body, is dependent on the type of vehicle that vehicle 100 is.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components that perform decisions and/or computations related to autonomous driving.

Figure 2:
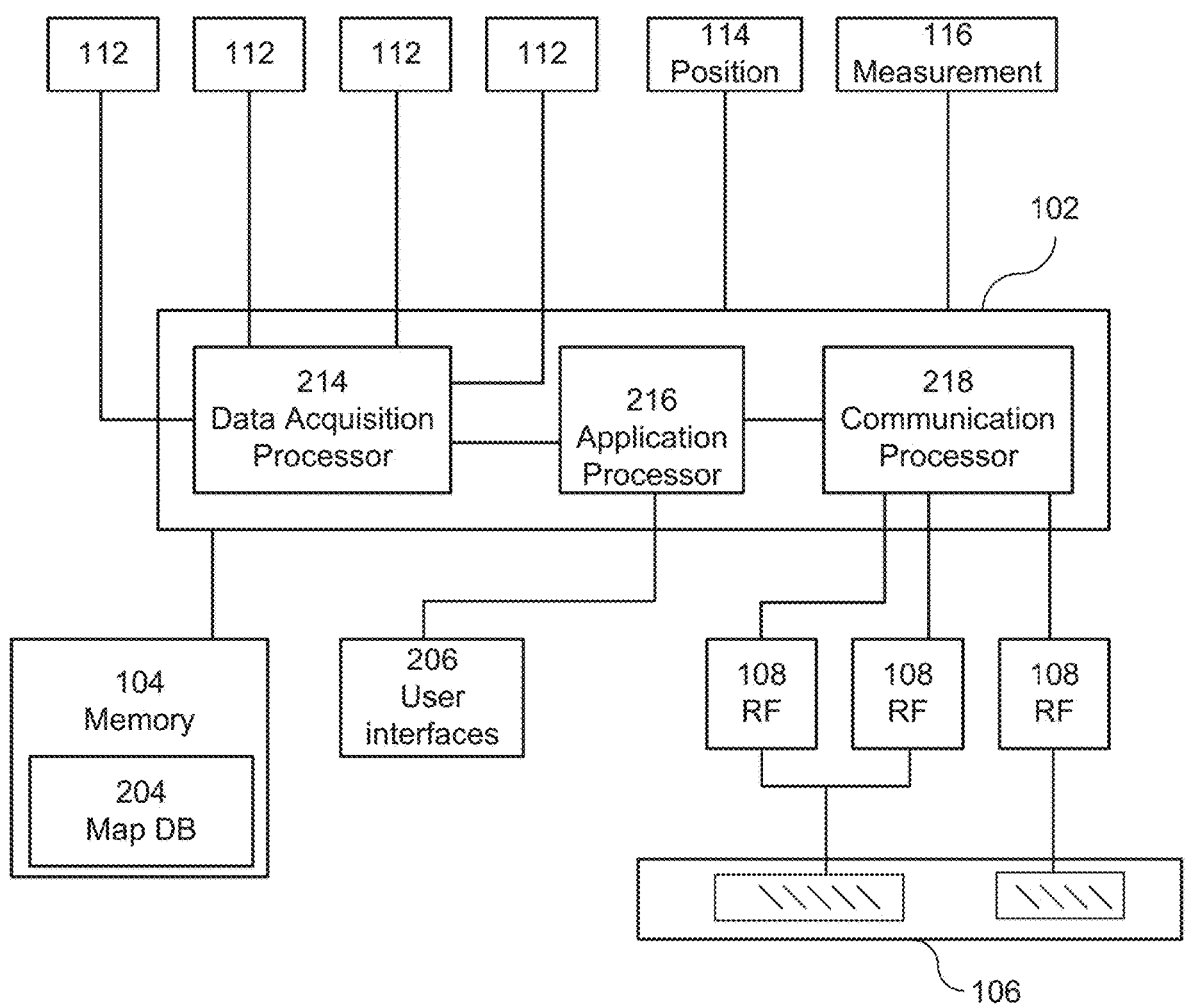
FIG. 2 shows various exemplary electronic components of a safety system of the vehicle in accordance with various aspects of the present disclosure.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a CPU, support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 214 may include processing circuitry, such as a CPU, for processing data acquired by data acquisition units 112. For example, if one or more data acquisition units are image acquisition units, e.g. one or more cameras, then the data acquisition processor may include image processors for processing image data using the information obtained from the image acquisition units as an input. The data acquisition processor 214 may therefore be configured to create voxel maps detailing the surrounding of the vehicle 100 based on the data input from the data acquisition units 112, i.e., cameras in this example.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), one or more user interfaces (UIs) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc. In the transmit path, communication processor 218 may therefore receive and process outgoing data provided by application processor 216 according to the layer-specific functions of the protocol stack, and provide the resulting data to other components, such as one or more RF transceivers 108. Communication processor 218 may also perform physical layer processing to produce digital baseband samples, which it may provide to RF transceiver 108. RF transceiver 108 may then process the digital baseband samples to convert the digital baseband samples to analog RF signals, which RF transceiver 108 may wirelessly transmit via antenna system 106. In the receive path, RF transceiver 108 may receive analog RF signals from antenna system 106 and process the analog RF signals to obtain digital baseband samples. RF transceiver 108 may provide the digital baseband samples to communication processor 218, which may perform physical layer and/or protocol stack layer processing on the digital baseband samples and provide the resulting data to other processors of the one or more processors 102, e.g., application processor 216. Application processor 216 may then handle the incoming data at the application layer, which can include execution of one or more application programs with the data and/or presentation of the data to a user via one or more UIs 206. One or more UIs 206 may include one or more screens, microphones, mice, touchpads, keyboards, or any other interface providing a mechanism for user input and/or for providing information to a user.

The communication processor 218 may include a digital signal processor and/or a controller which may direct such communication functionality of vehicle 100 according to the communication protocols associated with one or more radio access networks, and may execute control over antenna system 106 and RF transceiver(s) 108 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 100 shown in FIGS. 1 and 2 may depict only a single instance of such components.

Vehicle 100 may transmit and receive wireless signals with antenna system 106, which may be a single antenna or an antenna array that includes multiple antenna elements. In some aspects, antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. In some aspects, communication processor 218 may control the radio transmission and reception of RF transceiver(s) 108, including specifying the transmit and receive radio frequencies for operation of RF transceiver(s) 108.

According to some aspects, communication processor 218 includes a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processing and hardware accelerator components of the digital signal processor may be realized as a coupled integrated circuit.

Vehicle 100 may be configured to operate according to one or more radio communication technologies. The digital signal processor of the communication processor 218 may be responsible for lower-layer processing functions (e.g., Layer 1/PHY) of the radio communication technologies, while a controller of the communication processor 218 may be responsible for upper-layer protocol stack functions (e.g., Data Link Layer/Layer 2 and/or Network Layer/Layer 3).

The controller may thus be responsible for controlling the radio communication components of vehicle 100 (antenna system 106, RF transceiver(s) 108, position device 114, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 100 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 100 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 218 may include executable instructions that define the logic of such functions.

In some aspects, vehicle 100 may be configured to transmit and receive data according to multiple radio communication technologies. Accordingly, in some aspects one or more of antenna system 106, RF transceiver(s) 108, and communication processor 218 may include separate components or instances dedicated to different radio communication technologies and/or unified components that are shared between different radio communication technologies. For example, in some aspects, multiple controllers of communication processor 218 may be configured to execute multiple protocol stacks, each dedicated to a different radio communication technology and either at the same processor or different processors. In some aspects, multiple digital signal processors of communication processor 218 may include separate processors and/or hardware accelerators that are dedicated to different respective radio communication technologies, and/or one or more processors and/or hardware accelerators that are shared between multiple radio communication technologies. In some aspects, RF transceiver(s) 108 may include separate RF circuitry sections dedicated to different respective radio communication technologies, and/or RF circuitry sections shared between multiple radio communication technologies. In some aspects, antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Communication processor 218 may be configured to operate via a first RF transceiver of the one or more RF transceivers(s) 108 according to different desired radio communication protocols or standards. By way of example, communication processor 218 may be configured in accordance with a Short-Range mobile radio communication standard such as e.g. Bluetooth, Zigbee, and the like, and the first RF transceiver may correspond to the corresponding Short-Range mobile radio communication standard. As another example, communication processor 218 may be configured to operate via a second RF transceiver of the one or more RF transceivers(s) 108 in accordance with a Medium or Wide Range mobile radio communication standard such as, e.g., a 3G (e.g. Universal Mobile Telecommunications System—UMTS), a 4G (e.g. Long Term Evolution—LTE), or a 5G mobile radio communication standard in accordance with corresponding 3GPP ($3^{rd}$ Generation Partnership Project) standards. As a further example, communication processor 218 may be configured to operate via a third RF transceiver of the one or more RF transceivers(s) 108 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more RF transceiver(s) 108 may be configured to transmit signals via antenna system 106 over an air interface. The RF transceivers 108 may each have a corresponding antenna element of antenna system 106, or may share an antenna element of the antenna system 106.

Memory 214 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. In some aspects, each of the one or more antennas of antenna system 106 may be placed at a plurality of locations on the vehicle 100 in order to ensure maximum RF coverage. The antennas may include a phased antenna array, a switch-beam antenna array with multiple antenna elements, etc. Antenna system 106 may be configured to operate according to analog and/or digital beamforming schemes in order to maximize signal gains and/or provide levels of information privacy. Antenna system 106 may include separate antennas dedicated to different respective radio communication technologies, and/or antennas shared between multiple radio communication technologies. While shown as a single element in FIG. 1, antenna system 106 may include a plurality of antenna elements (e.g., multiple antenna arrays) positioned at different locations on vehicle 100. The placement of the plurality of antenna elements may be strategically chosen in order to ensure a desired degree of RF coverage. For example, additional antennas may be placed at the front, back, corner(s), and/or on the side(s) of the vehicle 100.

Data acquisition devices 112 may include any number of data acquisition devices and components depending on the requirements of a particular application. This may include: image acquisition devices, proximity detectors, acoustic sensors, etc., for providing data about the vehicle's environment. Image acquisition devices may include cameras (e.g., standard cameras, digital cameras, video cameras, single-lens reflex cameras, infrared cameras, stereo cameras, depth cameras, RGB cameras, etc.), charge coupling devices (CCDs) or any type of image sensor. Proximity detectors may include: radar sensors, light detection and ranging (LIDAR) sensors, mmWave radar sensors, etc. Acoustic sensors may include: microphones, sonar sensors, ultrasonic sensors, etc. Accordingly, each of the data acquisition units may be configured to observe a particular type of data of the vehicle's 100 environment and forward the data to the data acquisition processor 214 in order to provide the vehicle with an accurate portrayal of the vehicle's environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. drone vs. boat.

Position devices 114 may include components for determining a position of the vehicle 100. For example, this may include GPS or other GNSS circuitry configured to receive signals from a satellite system and determine a position of the vehicle 100. Position devices 114, accordingly, may provide vehicle 100 with satellite navigation features. In some aspects, the one or more position devices 114 may include components (e.g., hardware and/or software) for determining the position of vehicle 100 by other means, e.g. by using triangulation and/or proximity to other devices such as NIEs.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, or stereo processing of two or more images) of the environment of the vehicle 100 together with position information, such as GPS coordinates, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an engine control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to implement the aspects and methods described herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure.

FIG. 3 shows an exemplary network area 300 according to some aspects. Network area 300 may include a plurality of vehicles 100, which may include, for example, drones and ground vehicles. Any one of these vehicles may communicate with one or more other vehicles 100 and/or with NIE 310. NIE 310 may be a base station (e.g. an eNodeB, a gNodeB, etc.), a road side unit (RSU), a road sign configured to wirelessly communicate with vehicles and/or a mobile radio communication network, etc., and serve as an interface between one or more of vehicles 100 and a mobile radio communications network, e.g., an LTE network or a 5G network.

NIE 310 may include, among other components, at least one of an antenna system 312, a RF transceiver 314, and a baseband circuit 316 with appropriate interfaces between each of them. In an abridged overview of the operation of NIE 310, NIE 310 may transmit and receive wireless signals via antenna system 312, which may be an antenna array including multiple antenna arrays. Antenna system 312 may include multiple antenna elements (e.g., multiple antenna arrays) in order to employ multiple-input and multiple-output (MIMO) methods and schemes.

RF transceiver 314 may perform transmit and receive RF processing to convert outgoing baseband samples from baseband circuit 316 into analog radio signals to provide to antenna system 312 for radio transmission and to convert incoming analog radio signals received from antenna system 312 into baseband samples to provide to baseband circuit 316. Accordingly, RF transceiver 314 may be configured to operate similarly to the RF transceiver(s) described in FIGS. 1 and 2, albeit perhaps on a much larger scale (e.g., amplifiers to transmit higher power signals, etc.).

Baseband circuit 316 may include a controller 310 and a physical layer processor 318 which may be configured to perform transmit and receive PHY processing on baseband samples received from RF transceiver 314 to provide to a controller 310 and on baseband samples received from controller 310 to provide to RF transceiver 314. In some aspects, the baseband modem 316 may be located external to the NIE 310, e.g., at a centralized location of a mobile radio communication network. Controller 310 may control the communication functionality of NIE 310 according to the corresponding radio communication technology protocols, which may include exercising control over antenna system 312, RF transceiver 314, and physical layer processor 318. Each of RF transceiver 314, physical layer processor 318, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. NIE 310 may also include an interface 320 for communicating with (e.g. receiving instructions from, providing data to, etc.) with a core network according to some aspects.

Additionally, NIE 310 may include a memory 330, which may be internal to NIE 310 (as shown in FIG. 3) or external to NIE 310 (not shown). Memory 330 may store one or more maps of the coverage area of NIE 310 among other information. Each of the one or more maps may include a static layer depicting environmental elements that remain largely unchanged over longer periods of time (e.g., roads, structures, trees, etc.) and/or a dynamic layer with more frequent changes (e.g., vehicles, detected obstacles, construction, etc.). In some aspects, memory 330 may also store maps corresponding to one or more neighboring areas of NIE 310 so as to provide vehicles within its coverage area with information of neighboring coverage areas (e.g., to facilitate the process when a vehicle moves to the coverage of the neighboring NIE).

One of the challenges in autonomous driving is the need for vehicles to have real-time, HD feature maps which can adapt quickly by recognizing new hazards with high standards of accuracy, e.g., centimeter level accuracy, in a collaborative manner and updating the dynamic layers of the HD map. The requirements for accuracy in both the spatial and temporal domains may be resolved by applying crowdsourcing to construct the HD maps. These techniques may rely on the exchange and uploading of compressed map data. However, practical implementations may be limited by the capacity of the mobile radio communication network infrastructure. Also, since there are typically a number of observers to a new obstacle and/or hazard, there may be a large amount of redundant information that is sent to an entity in charge of aggregating the information for updating the HD map, e.g. an NIE or a cloud server. Accordingly, aspects of the disclosure herein present schemes which account for redundant transmissions to reduce the load on the mobile radio communications network bandwidth. For example, this may include limiting the amount of redundant transmissions to reduce traffic on the network bandwidth.

According to some aspects, methods and devices may provide and implement compressively sampled crowdsourcing schemes for developing HD maps for autonomous driving and other applications. Some of these schemes may be based on a Fountain Code approach. In this manner, the methods and devices of this disclosure address bandwidth limitation issues by trading off a modest increase in the average number of users for significant bandwidth savings. The disclosure herein also includes a framework for establishing strong location authentication, while preserving privacy, to verify reported features and identify malicious parties.

The methods and devices provided herein implement schemes which allow for the exchange and uploading of compressed data acquired at the vehicle-side (e.g., via one or more data acquisition devices and/or sensors) in order to function within the capacity of current and future mobile radio communication networks. Currently deployed schemes may be limited to only transmitting higher-level features (such as traffic conditions) to reduce bandwidth or only requiring delta (i.e. changes in) updates for road segments to be transmitted to a centralized server for aggregation, which then distributes the updates to the rest of the vehicle network. Furthermore, these schemes may fail to specify the same level of time granularity to meet "real-time" or a "time to reflect reality," which are requirements for implementing an efficient and safe autonomous driving systems. For example, a subclass of features related to road infrastructure quality (e.g., potholes, broken street lights, clogged storm drains, etc.) can be real-time with time with time granularities in the order of hours, while other events like accident or traffic jams require updates in the order of minutes or seconds. However, regardless of the number of vehicles in a specified area (and any required update frequency per class of feature), each vehicle may transmit the same collection of features. The repeated transmission of the same limited number of features may be particularly devastating to security. A lack of a strong location authentication allows for a malicious party to expose a crowdsourced map to a variety of security and privacy attacks through event forgery and targeted queries.

The schemes provided herein expand these limitations to be more all-inclusive in order to provide a more accurate portrayal of an HD map in real-time while eliminating the aforementioned shortcomings.

For a sparse system, compressing sampling theory asserts that the sparsity may be exploited to efficiently acquire and perfectly reconstruct a signal with far fewer samples than required by traditional (e.g., Nyquist-rate) sampling theory. Fountain Codes are a class of rateless erasure codes where K source symbols can be perfectly recovered using K' encoded symbols, where K' is equal to or slightly greater than K.

The methods and devices of this disclosure provide schemes to collect and reconstruct crowdsourced feature data (i.e., related to features of a dynamic layer of an HD map) and may be based on a combination of any of the following aspects.

A privacy preserving swarm of agents (i.e., vehicles) may be established through a mechanism to establish a secure communication channel between each of the agents and the centralized server (i.e. centralized host) that collates the crowdsourced data in to the updated, real-time feature HD map. This mechanism may include the use of anonymous, short-lived (e.g., in the order of seconds to minutes) random tokens, for example, which are received from the network for verification and authentication purposes. For purposes of the explanation herein, the terms "agent" and "vehicle" may be used interchangeably.

Each agent within the crowdsourcing swarm may continuously collect a set of features to be mapped (e.g., road geometry, lane and other road markings, road quality, traffic conditions, parking spaces, etc.) and tag each of the features with a temporal and location data (e.g., timestamp and GPS coordinates). Additionally, each feature can also be tagged with a priority level which provides a hierarchy ranking the importance and/or criticality for the detected features. For example, safety critical features like a vehicle collision can be given a higher priority level than other more mundane features, e.g., parking availability. Each agent is, in effect, compressively sampling their surrounding environment into a variety of spare "feature" domains.

Depending on their connectivity, available bandwidth, and the number of agents (i.e., vehicles) in the vicinity which are competing for the same available network bandwidth, each agent may select a random subset or subsets of features that are transmitted back to the centralized host server (or master device, in the case of decentralized map formulation as discussed herein). In this manner, the set of features is encoded in a distributed Fountain Code style process that guarantees continual reconstruction and refinement of the map. As used herein, an available bandwidth refers to an amount of frequency resources (i.e., within the frequency band spectrum) allocated for devices to use in a mobile radio communications network, e.g. in an LTE or 5G network, within a coverage area of an NIE or within a de-centralized network area (e.g., a vehicle cluster).

As used herein, the vicinity of the vehicle may be, for example, defined by an area around the vehicle up to, or in some cases greater than, a coverage area provided by an NIE. For example, for a vehicle located near the edge of an NIE's coverage area, another vehicle may still be in the vicinity of the vehicle if it is beyond the NIE's coverage area if both vehicles can still communicate with one another. In another example, the vicinity of the vehicle may be an area around the vehicle in which the vehicle may conduct RF communications. In other words, the vehicles in a particular vehicle's vicinity may be seen as the number of other potential vehicles competing for the same bandwidth, i.e., available bandwidth.

As used herein, the vehicle's environment may include objects, devices, and features that are located within an observable (from the vehicle's point of view) range of the vehicle. It is noted that the vehicle's vicinity may extend beyond its environment, e.g. other vehicles in the vehicle's vicinity may compete for available bandwidth with the vehicle even though they are not directly in the vehicle's environment.

There may be several possible methods for an agent to determine the amount of bandwidth available to itself for communicating features and estimating the number of other agents in the vicinity. A first of these methods may include the agent performing a distributed query to an ad-hoc or distributed information centric network of agents (i.e., vehicles) and NIEs to check the number of active participants within a certain geographic region. Another method may include the agent directly querying its associated NIE (e.g., base station) for the current (or in other aspects, the historical) distribution of the number of other active agents currently associated with the NIE. Similarly, an agent may directly query the centralized or distributed network infrastructure for the amount of bandwidth directly available to it for the specific task if the network protocol application programming interface (API) allows it. If not included within the existing network protocol API, a specialized check sequence can be added (which may include some overhead) to the transmitted feature set to measure the average allocated bandwidth and transmission latency which an agent may use to predict future bandwidth allocators.

Another method may include a more passive approach in which, without directly querying the agent's centralized or distributed network infrastructure, the number of agents may be estimated based on a number of factors including: token types, node density/neighbor-density, channel busy ratio from the radio access technology (RAT), etc. The same passive network infrastructure measurements may be used to predict the amount of bandwidth available to an agent. In another method, and not relying on any network measurements, the agent's own onboard detectors and sensors may be used to identify and count the number of other agents within its range and extrapolate that number to a range of potential agents within a certain geographic area using past statistics or other heuristic methods.

FIG. 4 shows an exemplary region 400 of a plurality of vehicles (i.e. agents) and feature reporting according to some aspects. It is appreciated that FIG. 4 is exemplary in nature and may therefore be simplified for purposes of this explanation.

Five features are shown in the region 400: a closed lane due to construction in the east-bound lane 410, a congested lane due to traffic 420, missing lane markers 430, a divided highway feature 440, and light traffic conditions 450. Given the number of agents shown in the region 400, according to aspects of this disclosure, each agent (i.e., vehicle A-J) would transmit fewer than all five of features 410-450 as opposed to transmitting all five features, therefore wasting bandwidth and flooding the network with high numbers of duplicates of the features (i.e., 10 reports for each of the features). However, according to the schemes proposed herein, each agent may randomly select, for example, two out of the five features to transmit, thereby reducing the required bandwidth by 60% while still providing sufficient redundancy for the central host server (in a centralized network) or one or more other vehicles (i.e., master vehicle or cluster heads in a decentralized network) to reconstruct a detailed feature map. If each agent reports two of the features as opposed to all five of them, there would be an average of four reports per feature to verify the feature's existence, location, etc.

The methods and devices may also implement schemes to priority high/critical priority features and way them differently to make their reporting more likely or mandatory. FIG.

5 shows an exemplary representation 500 illustrating how features may be prioritized differently according to some aspects: a nonfunctional streetlight 510 (e.g., the streetlight no longer emits light or emits very low light), a pothole 520, a four-way intersection with crosswalks 530, and a crashed car with a downed tree blocking a lane 540. The schemes disclosed herein may prioritize feature 540 foremost and make it a mandatory reported feature that must be reported, while features 510 and 520 may be a medium priority, and feature 530 may be the lowest priority (especially for purposes of updating the dynamic layer of the map).

Figure 5:
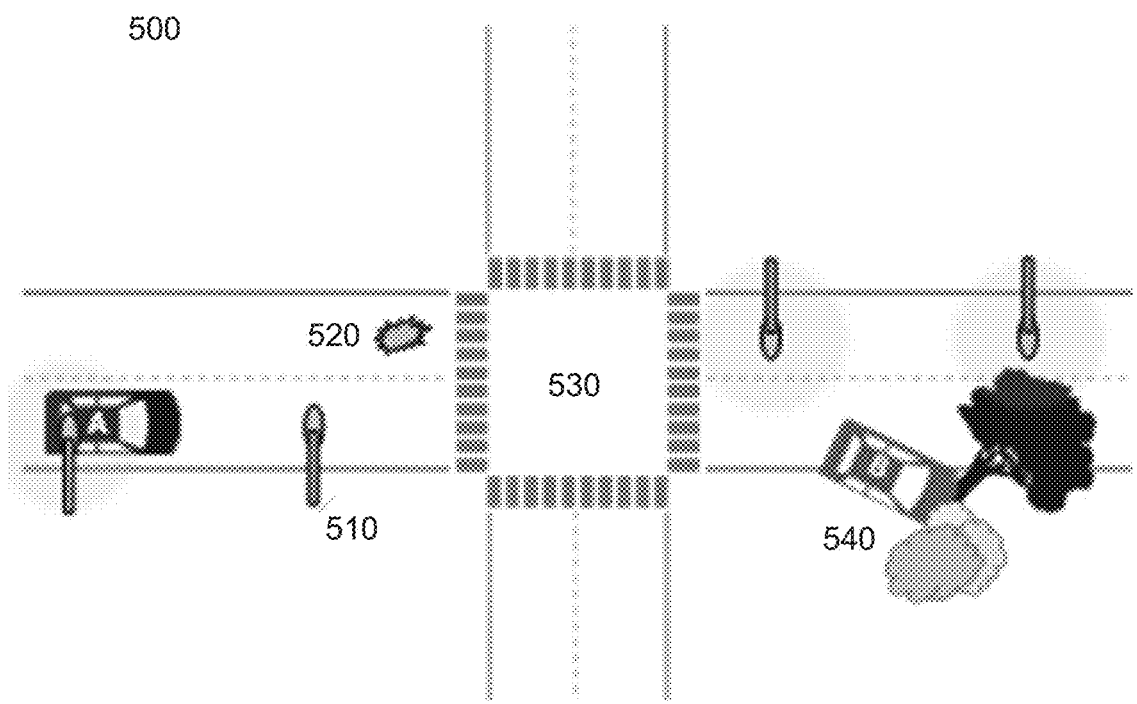
FIG. 5 shows an exemplary representation illustrating how features may be prioritized differently according to some aspects.

In the event of no network connectivity, the list of features for a region may be stored and transmitted at a later time. The collator (i.e. the host server in a centralized network) may use the temporal data (e.g., timestamps) of the features to appropriately factor the information into the real-time map, i.e. the real-time feature HD map. In this manner, the data transmission may be time bound so that stale features are weighed less, or even dropped completely, to prevent their transmission in order to maintain the accuracy and "real-time" quality of the feature map. For example, in FIG. 5, the presence of the feature 540 is not necessarily relevant hours after it was observed (i.e. the crash scene has been cleared), whereas information about the road geometry such as 530 is still relevant. Accordingly, the host can update the history of the feature map so that it can be used to extract other types of information (e.g., traffic patterns, gaps in mobile radio communication coverage, etc.).

The devices and methods disclosed herein may establish strong location authentication and feature verification by asking each agent to verify or reject a sub-set of features reported by other agents. In this way, an agent-reported feature map may not be trusted until the agent can verify features previously reported by other agents in the vicinity and until their reported features are verified by other agents.

Figure 6:
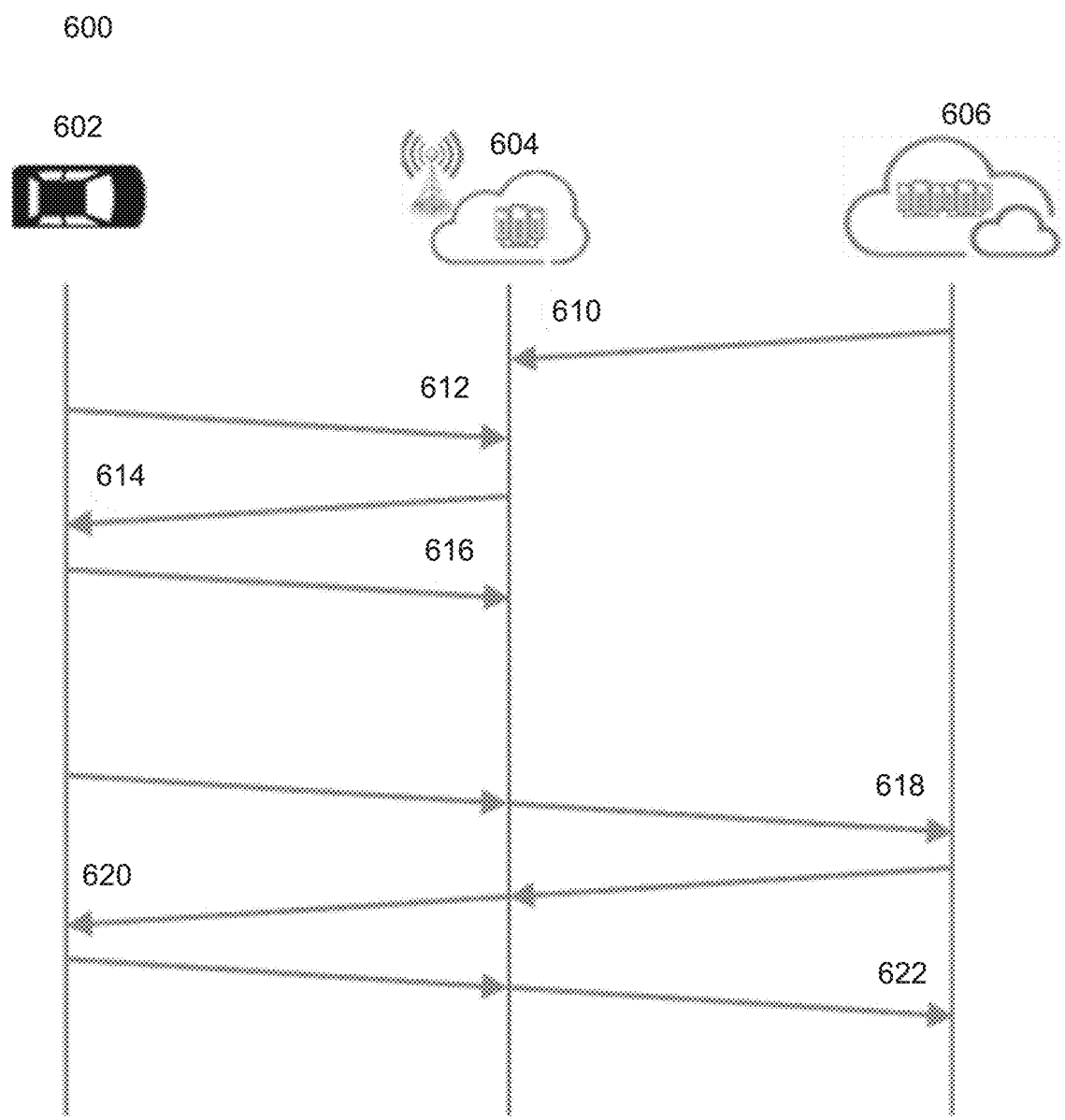
FIGS. 6-7 show exemplary message sequence charts (MSCs) illustrating protocols for authentication and feature verifications according to some aspects.
Figure 7:
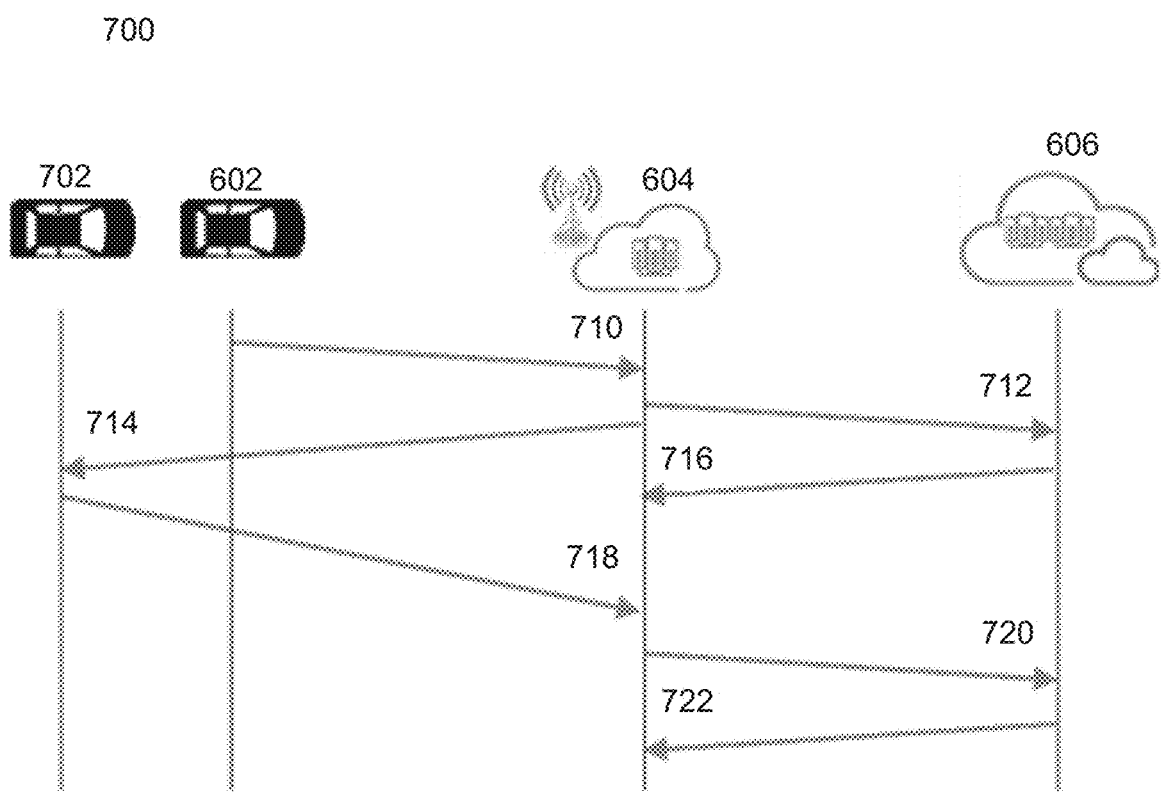

FIGS. 6 and 7 show exemplary message sequence charts (MSCs) 600 and 700, respectively, illustrating protocols for authentication and feature verifications according to some aspects.

MSC 600 shows a vehicle (i.e., agent) 602, an NIE (e.g., a base station) 604, and a cloud server (i.e. data-center, central host, host server, etc.) 606. In 610, the cloud server 606 updates the NIE 604 with a snapshot of the current HD feature map with confidence weights corresponding to each feature and/or an updated list of "trusted" users. In 612, vehicle 602 transitions into the geographical area of NIE 604 and begins to signal with NIE 604. In 614, NIE 604 initiates the feature verification process to establish a trust score for vehicle 602. In 616, vehicle 602 responds to the NIE 604 query. Features 614 and 616 may be repeated to refine the user trust score and establish updated confidence intervals for the queued features. The user trust score may be established, for example, based on a vehicle's past history of verified reported features or its affiliation (e.g., if the vehicle belongs to a predesignated list government-operated vehicles). For example, as the user trust score increases, the data transmitted by the corresponding vehicle may be given a greater weight. In the case that the vehicle 602 has never associated with the cloud server 606 of the NIE 604, or if the token associating vehicle 602 with the cloud server 606 has expired, then features 618-622 may be used. In 618, vehicle 602 begins to associate with NIE 604 and the cloud server 606. In 620, the cloud server 606 initiates feature verification to establish a trust score for vehicle 602 in a manner similar to 614. In 622, the response to 620 to the cloud server 606 is transmitted from vehicle 602, and several iterations of 620-622 may be performed in order to generate a token for vehicle 602 and establish a trust score while updating the feature map confidence.

MSC 700 shows an exemplary verification process with the same parties shown in MSC 600 where multiple vehicles, 702 in addition to 602, are involved. In 710, vehicle 602 observes and reports a new feature. In 712, the NIE relays the information to the cloud server 606 performing the aggregation across the region of interest (e.g., region covered by NIE 604). In 714, the NIE 604 initiates the feature verification by querying one or more other vehicles, in this case vehicle 702. In 716, the cloud server 616 acknowledges the feature and provides a confidence update based on information from other NIEs and a history trust score for vehicle 602. In 718, vehicle 702 responds to the NIE 604 causing the NIE 604 to revise its user trust score for vehicle 602 and confidence in the feature. In 720, an updated user trust score for vehicle 602 and confidence in the reported feature are transmitted to the cloud server 606. In 722, the cloud server 606 acknowledges the NIE'S 604 updates and provides a new aggregate confidence update and intervenes if necessary if vehicle 602's trust score drops below a certain threshold to direct the NIE 604 to take action isolate vehicle 602 to prevent malicious and/or untrustworthy actions.

According to the protocols shown in MSCs 600 and 700, for a particular geographic area, the cloud server may establish a rotating verification process based on feature selection that gets deployed to the NIEs. This subset of verification features can include, for example: high confidence/already verified features, low confidence/to be verified features, and/or false features obvious to an agent within the geographic area, but unknowable to agents outside of the area. The feature verification process may be triggered in response to certain events, including: at the NIE in response to the association with a new vehicle; by the server in response to the registration of a new vehicle, or reregistration/re-authentication of an old vehicle, with the host center served by the cloud server; by the vehicle when it transitions from one geographic region to another; when a vehicle reports a previously unseen "feature" to the NIE or the cloud server; and by the cloud server to confirm certain low confidence map features.

The verification responses can be weighed by a user trust score. This trust score can be based on an agent's past history of verified reported features or its affiliation (e.g., if the vehicle belongs to a predesignated list government-operated vehicles).

Under this framework, "real-time" or the "time to reflect reality" for the mapping of features becomes a "time to consensus" for the swarm, with an aggregated minimum of M weighted user reports for it to be considered a "reliably observed feature." An optimal (or near optimal) minimum "time to consensus" for verifying a feature is may be achieved by factoring in the user trust score when querying agents to verify features. For example, low confidence/to be verified features could be weighed in so that they are more likely to be sent to trusted users, or users with higher "user trust scores;" for verification by the base station/datacenter server. High confidence/already verified features, and obviously false features, could be weighed such that they are more likely to be sent to new, unverified, or low-trust agents to verify the user and/or establish a user trust score. Using this methodology, new features can be quickly verified and new users may be quickly established as trustworthy or not.

Additionally, low-trust and malicious users can be quickly identified and isolated from the feature map and/or making any contributions to it.

The protocols described herein may also provide a mechanism for detecting and preventing "event forgery" for the features on the HD map by helping to verify the physical location and presence of an agent. Once a suspicious "feature" has been flagged, a verification action may be initiated by edge/server. A predesignated/selected list of trusted nodes may be selected by the cloud server in advance to get verification. Trusted nodes may be RSUs, city-operated vehicles (e.g., buses, trains, and service vehicles), a third-party company owned vehicles (e.g., taxi) which has some kind of agreement with the server, etc. The protocols may also be used to help to identify "ghost" agents (i.e. spoofed or virtual users). In other aspects, false features may be issued by the host to verify whether an agent exists in the area it is reported to be in. This may include a deliberately nonexistent "feature" to be rejected to help verify the physical presence of the agents at the location. For example, with respect to FIG. 4, the host server may ask agents F, G, and J to verify that the closed lane on the highway is due to a disabled vehicle rather than road construction. Or, in FIG. 5, the host server may ask agent A to verify the road geometry as a four-way intersection with stop-lights, as opposed to stop signs. For a potentially fake or malicious agent, similar to the case of "event forgery," further steps may be initiated by the host server to attempt to verify the agent and isolate it from the network if the data sent by the agent is confirmed to be unreliable or malicious in nature.

In some aspects, devices and methods may further be configured to establish confidence bounds and metrics for observed features and contributions to the map for map completion. The confidence bound for all the features in a certain region may be established by formulating the observation of features as a generalized coupon collector problem. Given $\hat{N}_f$ observed features, $N_R$ reports from agents in the swarm located in the region, with a minimum of M reports per feature to be considered a "reliably observed feature," and an average of d reported features per agent report, then the probability of the true number of features may be bound by $N=\hat{N}_f+\Delta$, where $\Delta$ is some number of not yet observed features. Therefore, the upper bound on the average of number of reports needed may be expressed as $$\hat{\mu} \leq \frac{\hat{N}_f}{d}(\log(\hat{N}_f) + \log\log(\hat{N}_f) + M)$$

for the current number of observed features and $$\mu \leq \frac{\hat{N}_f + \Delta}{d}(\log(\hat{N}_f + \Delta) + \log\log(\hat{N}_f + \Delta) + M)$$

for the true number of features. Similarly, the variance for each may expressed as approximately $$\hat{\sigma}^2 \sim \left(\frac{\hat{N}_f}{d}\pi\right)^2 / 6 \text{ and } \sigma^2 \sim \left(\frac{\hat{N}_f + \Delta}{d}\pi\right)^2 / 6,$$

respectively.

Therefore, the probability that $\hat{N}_f \neq N$ (or $\Delta \neq 0$) is given by ERF $$\left(\frac{N_R - \hat{\mu}}{\hat{\sigma}\sqrt{2}}\right) - \text{ERF}\left(\frac{N_R - \mu}{\sigma\sqrt{2}}\right).$$

For example, if there are 50 currently observed features in an area (N=50), with an average of 8 reported features per swarm user (d=8) and a minimum of 15 reports per feature to be considered it a "reliably observed feature" (M=15): for 40 reports ($N_R$=40), or 0.8 vehicles per feature, the probability of additional unobserved features is 9.77%; for 50 reports ($N_R$=50), or 1.0 vehicles per feature, the probability of additional unobserved features is 3.71%; for 60 reports ($N_R$=60), or 1.2 vehicles per feature, the probability of additional unobserved features is 0.30%; and for 70 reports ($N_R$=70), or 1.4 vehicles per feature, the probability of additional unobserved features is 0.0052%.

In sum, the average bandwidth per agent may be exchanged for an increased number of users to guaranteed full reconstruction of the HD Feature Map. Additionally, the additional number of users needed scales slower than the rate at which their average bandwidth decreases, resulting in significant bandwidth savings at the global level (e.g., 1.4× increase in the number of users results in a 6.25× decrease in the average required bandwidth for a 4.46× savings in global bandwidth).

Figure 8:
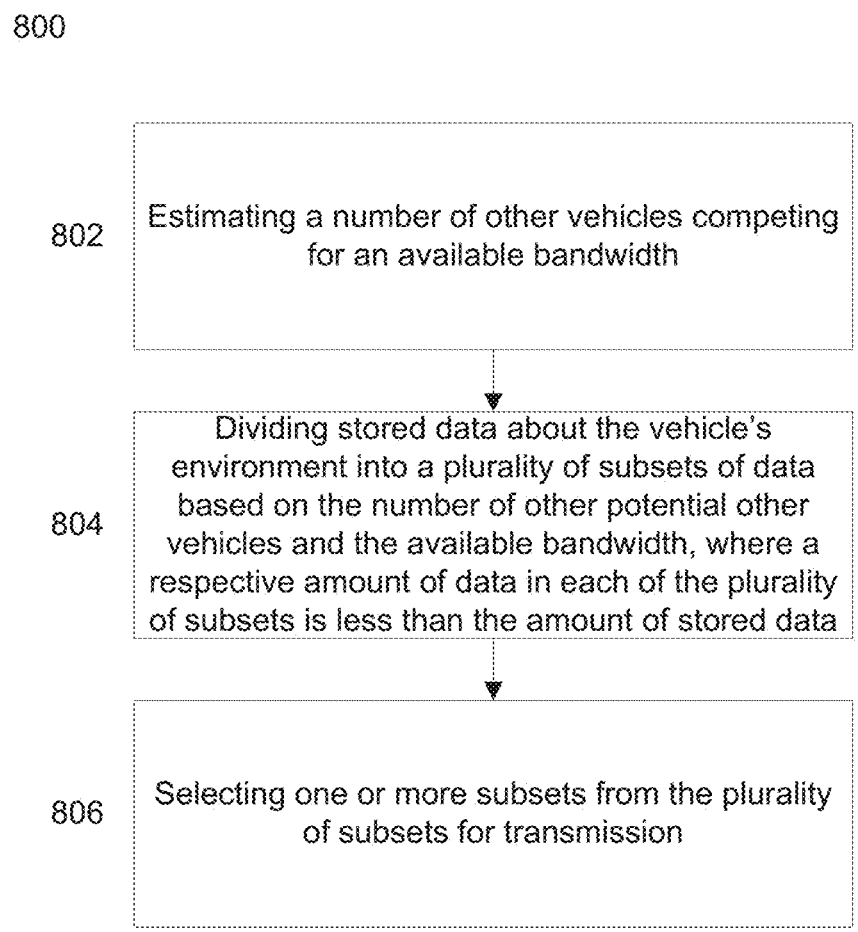
FIG. 8 shows an exemplary flowchart detailing a method for a vehicle to communicate features it observes about its environment to assist in building a map for use in vehicle navigation control according to some aspects.

FIG. 8 shows an exemplary flowchart 800 detailing a method for a vehicle to communicate features it observes about its environment to assist in building a map (i.e., HD map, feature map, HD feature map, or the like) for use in vehicle navigation control according to some aspects.

The method may include: estimating a number of other vehicles competing for an available bandwidth 802; dividing stored data about the vehicle's environment into a plurality of subsets of data based on the number of other vehicles and the available bandwidth, wherein a respective amount of data in each of the plurality of subsets is less than the amount of stored data 804; and selecting one or more subsets from the plurality of subsets for transmission 806. The stored data may include data about the vehicle's environment collected by one or more data acquisition devices. The method may also include transmitting the selected one or more subsets.

Figure 9:
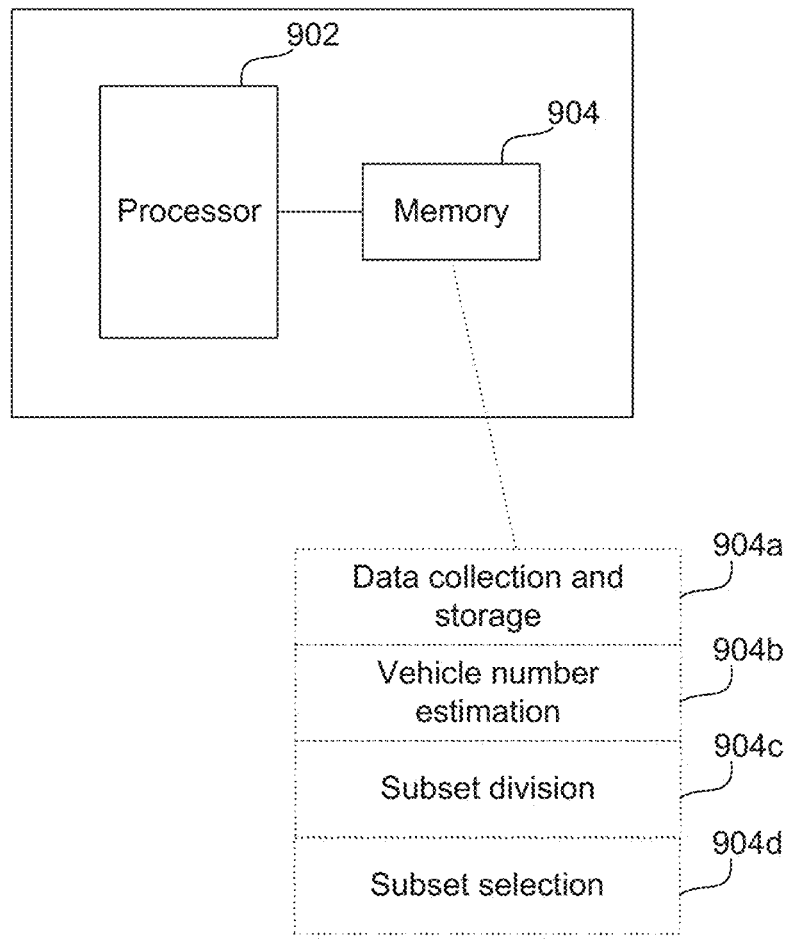
FIG. 9 shows an exemplary internal configuration of a device according to some aspects.

FIG. 9 shows an exemplary internal configuration of a device 900 according to some aspects. As shown in FIG. 9, device 900 may include processor 902 and memory 904. Processor 902 may be a single processor or multiple processors, and may be configured to retrieve and execute program code to perform the transmission and reception, channel resource allocation, and cluster management as described herein. Processor 902 may transmit and receive data over a software-level connection that is physically transmitted as wireless radio signals by radio frequency equipment. Memory 904 may be a non-transitory computer readable medium storing instructions for one or more of a data collection subroutine 904a, a vehicle number estimation subroutine 904b, a subset division (i.e., dividing the collected data into subsets) subroutine 904c, and/or a subset selection subroutine 904d.

Data collection subroutine 904a, a vehicle number estimation subroutine 904b, a subset division (i.e., dividing the collected data into subsets) subroutine 904c, and/or a subset selection subroutine 904d may each be an instruction set including executable instructions that, when retrieved and executed by processor 902, perform the functionality of the devices and the methods described herein, e.g., with respect to the method described in FIG. 8 and/or other parts of this disclosure. For example, data collection subroutine 904*a* may include instructions for the storing of data collected from one or more data acquisition devices.

The HD maps may include static portions (or static layers) covering features which remain largely unchanged (e.g. street boundaries, buildings and other structures, etc.) and dynamic portions (or dynamic layers) covering features which change more rapidly (e.g. other moving vehicles, accidents, obstacles, etc.). The dynamic layer of the HD maps may be constructed in a cooperative manner. This may allow the vehicles to obtain more accurate and reliable near real-time content and contextual information about its environment. An HD map may be maintained at a centralized server (e.g., belonging to a third party such as a road safety authority or a city, local, or state authority) running on a cloud network and road dynamics are captured and/or detected by various sensors of the vehicles or network infrastructure elements. Formation of the dynamic layer involves frequent, large-data communications between vehicles and the server, which may incur a significant burden on mobile radio communication network attributed to the various V2I links or V2V links. These frequent, large-data communications may be, for example, recurrent transmissions containing data detailing a vehicle's surrounding environment. For example, vehicles may be limited to a certain amount of data per distance unit, e.g. 10 KB/km, due to bandwidth limitations of the mobile radio communication network.

The dynamic layer of the HD map may be updated according to multiple scenarios, which may in some cases depend on central network coverage, for example. In one scenario, the vehicles may communicate the map updates to a central server which is charge of frequently computing the changes required to update the dynamic layer. In a second scenario, the map update may be decentralized, i.e., one or more vehicles may collate all the required map updates to update the dynamic layer and communicate the dynamic layer to other vehicles and/or the server.

In some aspects of this disclosure, methods and devices are provided which reduce communication overhead between vehicles and the server of a mobile radio communication network when a modification of the current HD map is detected. For example, with respect to the first scenario described above with a centralized server updating the dynamic layer, each vehicle may broadcast a subset of the detected information about its environment using a distributed fountain code and the server may collate the information and then update the HD map. In another example, with respect to the second scenario described with a decentralized approach, one or more of the vehicles may collate the required changes to the dynamic map and then communicate the updated dynamic map to other vehicles and/or the central server. A gossip algorithm may be used to minimize the communication required on the mobile radio communication network. Methods and devices are able to capture dynamic objects within their environment and propagate this information to a host server on the cloud and/or other vehicles in an efficient manner using semantically labeled volumetric maps using a sampled crowdsourcing method. In some aspects, the sampled crowdsourced method is based on distributed Fountain codes (e.g., the methods may be Fountain code-like) to reduce the redundant transmissions on the network from multiple observers to the entity (e.g., host server, master device or clusterhead in a decentralized network, etc.) that is updating the HD map. This approach allows for coordination between users to optimize the bandwidth of the V2I link by in which each vehicle to transmits a random subset of the differences detected on the feature HD map based on the number of other users, the current achievable rate, etc.

Additionally, in some aspects, methods and devices are configured to implement a decentralized coordination between multiple observers to collate changes detected for the HD feature map. A master device or clusterhead may be implemented to coordinate devices in a decentralized network to overcome overhead problems encountered in a completely decentralized approach.

Vehicles with autonomous capabilities rely on accurate HD maps to position themselves and respond to changes in their environment. The methods and devices disclosed herein allow for efficient updating of feature of the HD map (especially on the dynamic layer) using crowd sourcing that works within the existing mobile radio communication network infrastructure. The base layer of the HD map may first be formed by using dedicated cars equipped with a rich set of sensors and detectors, or it may be formed over time by other devices and/or vehicles which are able to construct a portrayal of the environment which is largely static, i.e., unchanging. This base layer may be made available to autonomous vehicles and other network elements to download and use. However, most environments (i.e., whether they be road environments or other terrain, aerial environments, aquatic environments) are dynamic and due to various reasons, the HD map must be updated with features to accurately reflect a vehicle's environment in real-time (or near real-time). The disclosure herein provides mechanisms and schemes to capture and propagate dynamic features (e.g., presence or removal of new objects in a vehicle's environment) to the cloud and other vehicles in a bandwidth efficient manner. In one exemplary aspect, these features may include at least one of any of the following: using an octree-based 3D modeling of the environment to provide a compact and unified representation of new changes (i.e. deltas), whether they be changes to the static layer or dynamic layer, compared to the baseline, or reference, HD feature map; determining whether captured dynamic changes are persistent and hazardous for driving; and creating an ad-hoc network with neighboring vehicles and/or NIEs to determine the amount of availability of network bandwidth.

Furthermore, each vehicle (or agent) may determine a confidence metric (i.e., confidence score) for object perception based on the location of the object and vantage point, and the vehicle may broadcast (or selectively transmit) a subset of the volumetric representation and labels (if available) of hazardous object in the environment using a Fountain code algorithm along with the determined confidence metrics. The aggregator (which may be a NIE, a master device or clusterhead, a host server in the cloud, etc.) may validate the confidence metrics as well as the devices providing the subset of the observed features. A gossip algorithm-based reconstruction then quickly aggregates the results and updates the HD features map accordingly. The confidence metric may be based on a number of variables, including: distance between the vehicle and the detected feature, relative position to the detected feature, line of sight (LoS)/vantage point, sensor and/or detector equipment, etc.

As shown in FIGS. 1 and 2, vehicles may be equipped with a number of detectors and sensors (i.e., generally speaking, the data acquisition devices) to acquire/detect data about the environment and recognize driving-related objects and dynamic objects in the environment (e.g., other vehicles, driving routes, road infrastructure, trees, signs, pedestrians, fallen objects, etc.). The recognition results enable each vehicle to build an accurate representation of its surroundings and navigate safely. The acquired sensor data may be classified according to two types of data: range/depth data and appearance data. The appearance data undergoes semantic segmentation process to recognize objects and provide them with proper semantic meaning. The range/depth data output is used to construct a local and instantaneous volumetric map after applying voxelization. The processors (e.g., data acquisition processors such as an image recognition processor) converts a continuous geometric primitive (i.e., object) to an array of voxels in the 3D space that approximates the shape of the object. The volumetric presentation and semantic meaning are eventually fused to form a 3D volumetric semantic map of the surroundings.

The volumetric map is constructed with respect to the vehicle's vantage point and its reference frame. In the case of multiple sensors in a car, this volumetric map may be a fused vantage point for that vehicle. The HD map itself assumes a common vantage point and the observations from multiple observers (e.g., vehicles) need to be aligned to this frame of reference. The coordinate system may be moved to be aligned with two or more different observations. This is done using a rigid body transformation. A rigid body transformation matrix $T_{cw}$ (shown below) contains a 3×3 rotation matrix and a 3-element translation vector. This transformation matrix describes how to transform a position from one camera's coordinate frame to another:

$$T_{cw} = \begin{bmatrix} RotX.x & RotY.x & RotZ.x & Translation.x \\ RotX.y & RotY.y & RotZ.y & Translation.y \\ RotX.z & RotY.z & RotZ.z & Translation.z \\ 0 & 0 & 0 & 1 \end{bmatrix}$$

Figure 10:
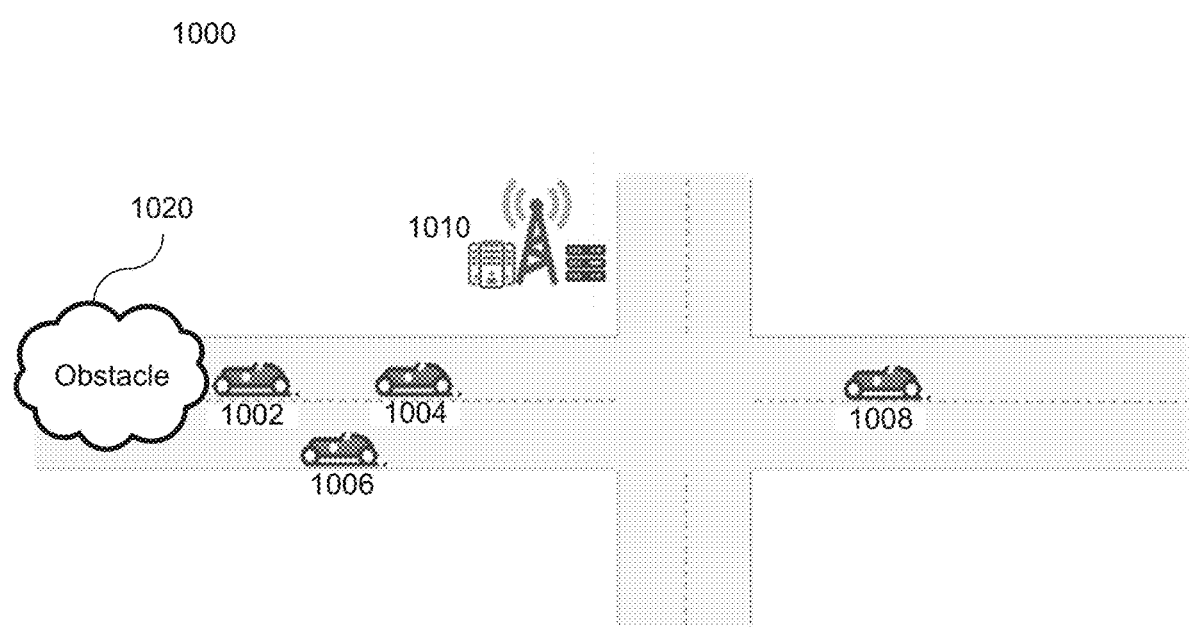
FIG. 10 shows an exemplary road environment scenario according to some aspects

A precise location and volumetric representation of the feature change to be communicated (e.g., obstacle, hazard, etc., as shown in FIG. 10) may be required. The first issue that must be considered is that there may be multiple vantage points from which the hazard is observed by multiple cameras and other sensors. Since only some of the vehicles may have a line of observation, information captured at multiple vantage points needs to be combined after a proper validation process. In order to combine observations from two different vantage points, a coordinate system to align the two observations is required. This is done using a rigid body transformation and is referred to as localization. In general, it makes sense for the different vehicles (i.e., observers) to perform such an alignment to the frame of reference of an HD map.

In some exemplary aspects, an octree-based representation of a volumetric map of the 3D space is used to easily specify deltas (i.e., changes to the feature HD map). An octree recursively partitions a 3D space into 8 octants to show more details (as shown in FIG. 10) at higher granularities as needed. An HD map based on an octree representation may include an implementation of an octree-based 3D model of arbitrary environments that is easily updateable, flexible and compact. It may provide proper distinction between occupied and free spaces. This also allows extension of the HD map by adding new information perceived by sensors, thereby making it ideal for representing new objects. It is compact and only makes changes to the octree which need to be communicated. There could be situations where there are multiple dynamic objects that are identified, and therefore there would be multiple subtrees that need to be transmitted.

The depth of the octree is a function of the level of detail about the object that is available. Due to the vantage point of multiple observers, the level of detail that different observers have would be different and hence the depth of the octree for each respective observer is different. According to some exemplary aspects, the host server may query the different observers to determine the level of detail about the object they possess and hierarchically build the tree (node by node) on the server by using a subset of observers that have details about that level. As an example, in FIG. 11, the building of the tree to represent a newly detected feature would start with subtree T1 and then move subtree T2 and then subtree T3. Each subtree of the overall octree may correspond to a respective subset of data from the (overall) collected data, which may correspond to the complete octree. For example, any combination of T1, T2, and T3 may be referred to as a plurality of subsets of data, where each of T1, T2, and T3 are a subset of data.

With a large number of autonomous vehicles in a given region (e.g., cars on a road, drones in a specific air space, etc.), multiple vehicles are likely to observe hazardous dynamic objects from different viewpoints, and it may be wasteful of precious network bandwidth for all the observers broadcast redundant information, i.e. every subtree of the octree from its vantage point. The devices and methods of this disclosure may optimize network bandwidth by implementing Fountain code-based techniques to enable multiple vehicles in a given vicinity (i.e., number of other vehicles competing for an available bandwidth) to share partial octrees (representing a dynamic object) over lossy or lossless wireless channel and construct the whole octree at a central location, e.g., an NIE such as a base station or RSU, a master device or clusterhead, a host server in the cloud, etc. Fountain codes are rateless erasure codes where one can take some message of size N and transform it into an effectively unlimited number of encoded chunks of size k. The original data may be reassembled given any subset of those chunks (m), as long as m*k≥N size. According to some aspects, a variant of the Fountain code where multiple observers (M) transmit different encodings of the subtree corresponding to dynamic objects which need to be added to a HD map is presented. Each of the observers may transmit an encoded packet whose size≥N/M, where N is the size of the subtree that needs to be broadcast. The advantage of this scheme is the more optimal use of the network bandwidth and the ability for each vehicle to individually optimize its bandwidth allocation. Furthermore, a network coordination of the different encoded messages to be transmitted from the different observers may be required.

FIG. 10 shows an exemplary road environment scenario 1000 according to some aspects. Multiple vehicles 1002-1008 may be travelling on a road with an obstacle 1020 and a Road Side Unite (RSU) with Mobile Edge Computing (MEC) 1010 or other NIE located nearby. In scenario, since an NIE (i.e., RSU 1010) is located nearby, the RSU 1010 may play the role of coordinator and/or data aggregator.

The vehicles 1002-1008 may be configured with RF components and circuitry as discussed with respect to FIGS. 1 and 2 and be capable of communicating over existing V2I or V2V channels with RSU 1010 and the other vehicles, respectively. Each of vehicles 1002-1006 may use an octree-based representation to capture the presence of a dynamic object such as obstacle 1020. According to some aspects, the vehicles 1002-1006 share the entire octree of obstacle 1020

(i.e., share the complete set of data detected with respect to obstacle 1020), even though the octree contents may be completely or partially identical. This may introduce unnecessary transmissions in the network that may overload the available network bandwidth, and, in case of the network protocol calling for retransmissions where transmissions are not successful, this may be even further exacerbated due to retransmissions if the channels are lossy in nature.

Figure 12:
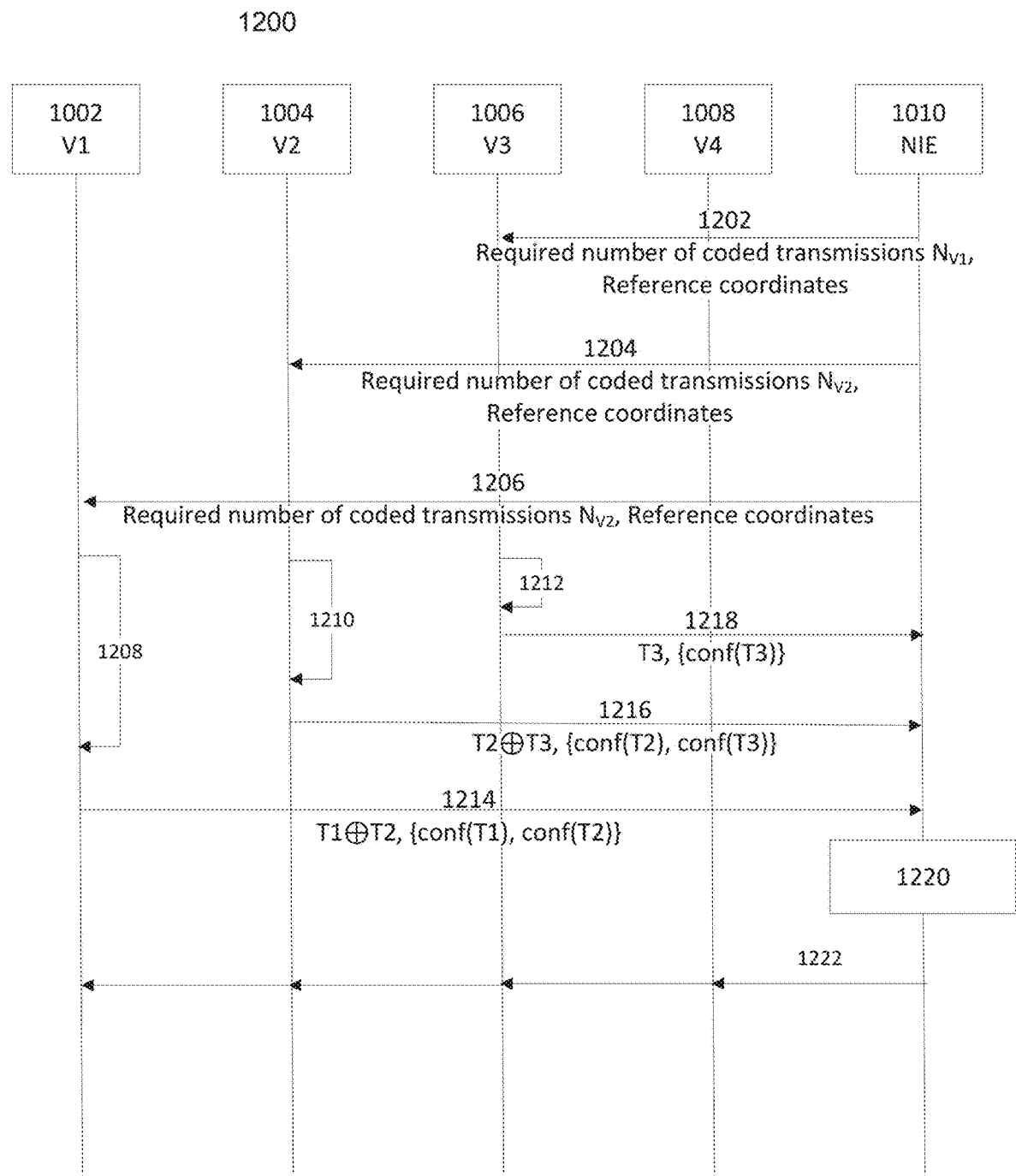
FIGS. 12-14 show exemplary MSCs according to some aspects.

Instead, according to some aspects, methods and devices may implement a Fountain code type mechanism as depicted in FIG. 12 showing exemplary MSC 1200 and which may include the following steps.

The NIE 1010 (RSU, or other coordinating NIE in a centralized network scenario) may use a push-based mechanism to inform each of the vehicles as they enter its coverage about a global reference system and a number of coded transmissions ($N_F$) that it should make 1202-1206. Upon detection of an object in the environment, e.g., obstacle 1020 in FIG. 10, each vehicle 1022-1006 may create an octree-based representation of that object and transform its own representation into the global coordinate system. Assuming each octree level as one block, each vehicle 1002-1006 creates $N_F$ coded packets by mixing the number of blocks present in its octree representation. Then, in some aspects, each of the vehicles 1002-1006 may start a random timer 1208-1212 before transmitting each of the coded block over the air in 1214-1218. The random timer may ensure that the vehicles that observe the same dynamic object within a vicinity are not competing for the same communication resources (e.g., in the frequency and/or the time domains). While transmitting the coded blocks (1218 for vehicle 1002, 1218 for vehicle 1004, 1214 for vehicle 1006), each vehicle may also include a confidence metric (i.e., confidence score) for each of the subtrees presented in that block. This metric represents how confident the vehicle is in assessing the presence of an object (or part of an object) represented by the subtree. The confidence metric may be based on a number of variables, including: the distance between the vehicle and the detected feature, the relative position to the detected feature, the LoS/vantage point, the sensor and/or detector equipment quality, etc.

Figure 11:
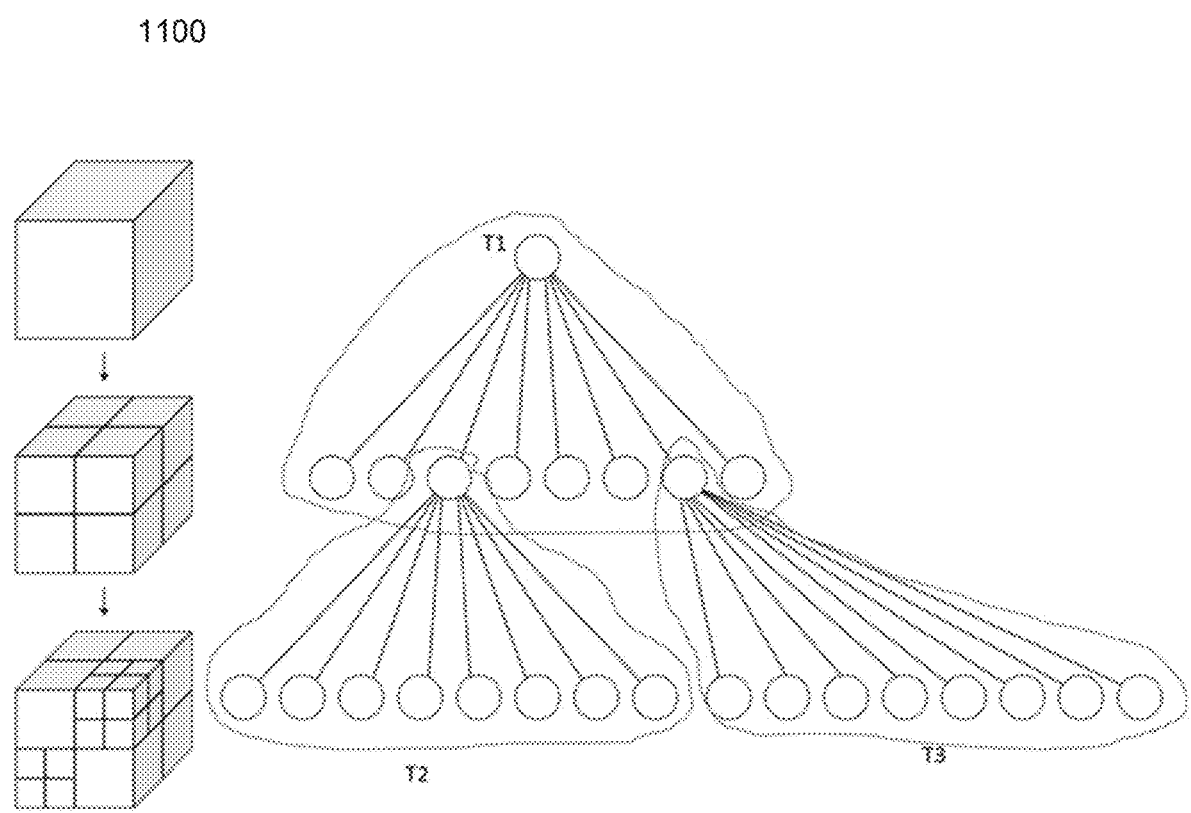
FIG. 11 shows an exemplary octree illustration according to some aspects.

For example, consider that obstacle 1020 in FIG. 10 may be represented by the octree representation 1100 shown in FIG. 11, with each of T1-T3 being a subtree of the complete octree representation 1100. If $N_F$ is set to 1 in this example, vehicle 1002 may transmit T1 XOR T2 in its coded message in 1218, vehicle 1004 may transmit T2 XOR T3, and vehicle 1006 may transmit T3. It is appreciated that other combinations of the subtrees (i.e. any of T1-T3 shown in FIG. 11) may be communicated and these subtrees are chosen purely for explanatory purposes. In addition to the subtrees communicated to the NIE 1010 in messages 1214-1218, each of the vehicles may include a confidence metric in the messages. For example, if vehicle 1002 transmits T1 XOR T2 in coded message 1218, it may also include {conf(T1), conf (T2)}; if vehicle 1004 transmits T2 XOR T3 in coded message 1216, it may also include {conf(T2), conf(T3)}; and if vehicle 1006 transmits T3 in coded message 1218, it may also include {conf(T3)}. Each of these metrics, i.e. conf(T\_), represent the confidence metric for each of the respective subtrees from the respective vehicle's point of view.

Upon reception of all of the coded blocks, the NIE 1010 decodes and reconstructs the octree representing the dynamic object, e.g. obstacle 1020, in 1220. It may utilize the confidence metric associated with each subtree communicated from the vehicles and use it to calculate a joint/aggregate confidence metric. One example of this may include taking a minimum of all the confidence metrics. If the aggregate confidence metric exceeds that of a defined threshold, the NIE 1010 may use the decoded/reconstructed octree to update its HD map with the feature and update the vehicles in 1222, including oncoming vehicle 1008.

The joint/aggregate confidence metrics as described in this disclosure may account for the fact that there are multiple observers whose vantage points and views of an object may not all be the same. Some observers may have a better view and therefore have a higher confidence of the contents of the subtree(s) of the octree corresponding to the object. Accordingly, it makes sense for the receiver to give a higher weight to the observer with the higher confidence score. According to some aspects, the amount of bandwidth allocated to each observer to transmit the dynamic object could be a function of their own confidence metrics. In this sense, the size of the encoded message can be scaled based on confidence metric, i.e., the size of the encoded messages received from the different observers would be $k_1, k_2, k_3 \ldots$ which are function of the confidence metric. In an extreme case, there may be only one observer serving as the transmitter of information. Also, the number of observers that can provide information at a certain level of detail of an object may be reduced and only that subset of observers will transmit the information about that level. Therefore, there may need to be a different set of transmitters at each vehicle and the amount of information that each vehicle transmits may need to be adjusted accordingly. Or, in some aspects, the information may be transmitted according to a scheduling scheme. In a multiple object scenario, each object would be treated differently and each subtree would have a different confidence score.

According to some aspects of this disclosure, explicit use of a Fountain code approach as discussed above would require to make sure subtrees (i.e., T1-T3 in the above example) are present in some form collectively across all the encoded transmission from the vehicles (i.e., vehicles 1002-1006 in the above example) to enable the data aggregator/compiler (i.e., NIE 1010 in the above example) to decode. This may not always be the case because different vehicle octree representations for the same object may be different due to the data acquisition device and/or processor quality, position, orientation, etc. Therefore, other mechanisms to account for these scenarios may include avoiding explicit octree encoding and may allow each vehicle to share a subset of the octree instead of sharing the whole octree representation of the detected feature from each of the respective vehicles.

In real network implementations, it is appreciated that adjacent NIEs (e.g., adjacent RSUs and/or base stations) may be far away requiring each NIE to handle a dynamic map update for a bigger geographic area involving multi-hop wireless communications. In such a case, the NIE may handle the dynamic map updates for the part of the geographic area within its 1-hop coverage, while it can select one or more coordinators and/or aggregators which may be referred to as "Dynamic Map Update Helper(s)" for the remaining geographic area to assist in the map update. The Dynamic Map Update Helper(s) may handle the map updates in their coverage and send the aggregated update to the NIE 1010.

Each of vehicles in this approach may share a subset of their octree representation instead of explicitly encoding all the subtrees present in its set. This may provide several advantages, which may include: (i) partial construction of the octree is possible even though some subtrees (or blocks)

are absent, and (ii) data bandwidth reduction since each vehicle is sharing a subset of octree, not the whole octree representing the dynamic object. This approach can be implemented with both RSU-coordinated and decentralized-coordinated fashions.

Figure 13:
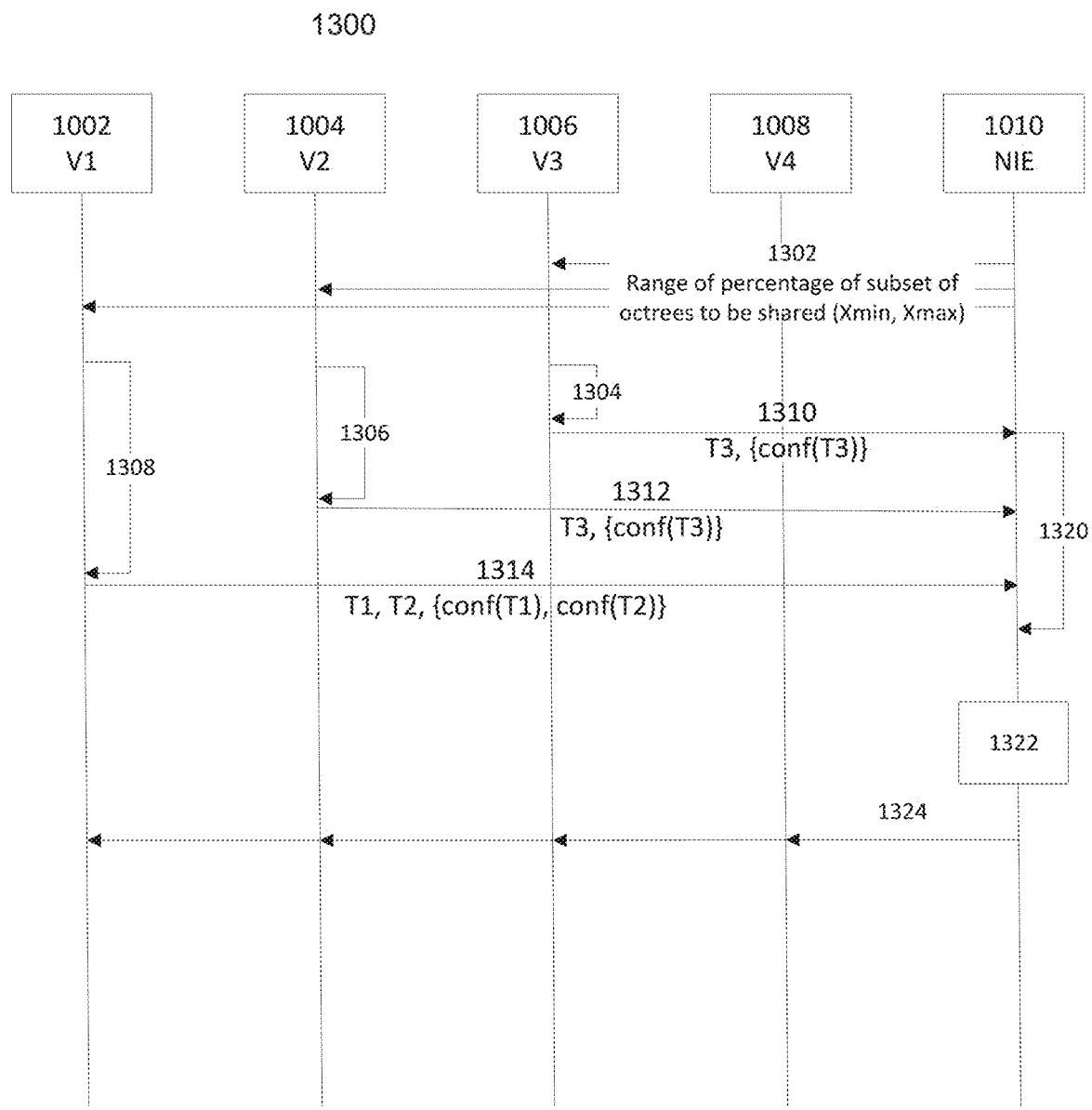

FIG. 13 shows an exemplary MSC 1300 illustrating a mechanism for updating an HD map according to some aspects. Like other figures in this application, it is appreciated the FIG. 13 is exemplary in nature and may thus be simplified for purposes of this explanation. MSC 1300 is based on the exemplary scenario depicted in FIG. 10 and uses this scenario to discuss the required steps in constructing the octree for the detected obstacle 1020.

In MSC 1300, the NIE 1010 plays the role of coordinator and/or aggregator. The NIE 1010 may periodically broadcast a message 1302 indicating a range of [$X_{min}$) $X_{max}$] of percentage of octree subsets. This allows each vehicle to share at least $X_{min}$ percentage of their octree subsets and up to $X_{max}$ percentage of their octree subsets depending on their confidence level in detecting an object. The minimum percentage of reporting ensures collection of subtrees from various vantage points and the maximum percentage can help to get more subsets from the vehicles who have better confidence. The NIA 1010 can optionally include the required number of retransmissions from each vehicle in the broadcast message in addition to other information discussed in this disclosure (e.g., reference coordinates).

Each vehicle 1002-1006 receives and stores the range of percentage of octree subsets, [$X_{min}$, $X_{max}$] broadcast in 1302 by the NIE 1010. Upon detection of the dynamic object, a vehicle V calculates its respective percentage, $X_{Vi}$=f($X_{min}$, $X_{max}$, ConfidenceScore$_{Vi}$), where $X_{min} \leq X_{Vi} \leq X_{max}$. For purposes of this explanation, let's assume the calculated percentages for vehicles 1002-1006 are 67%, 33%, and 33%, respectively, where vehicle 1002 is closer to the object and thus has a higher confidence score in detecting the obstacle.

Each vehicle 1002-1006 may use a random timer 1304-1308 before starting its transmission 1310-1314 to avoid collisions with the neighboring vehicles sensing the same dynamic object. Once the timer is fired, a vehicle $V_i$ sends $X_{Vi}$ percentage of its octree (which translates into a number of subtrees) together with the confidence score for each subtree. In MSC 1300, vehicles 1002, 1004, and 1006 send out {T1, T2}, {T3}, and {T3} respectively, with their associated confidence metric in 1310-1314.

When NIE 1010 receives the first set of subtrees corresponding to a particular object (or, location), e.g. 1310 b, it starts a timer 1320 to wait to receive subtrees from the all or a pre-configured number of. If the timer expires before receiving subtrees from those vehicles (either due to vehicles moving out of the range or packet loss over wireless channel), NIE 1010 will construct the octree based on the received subtrees, which may result in an octree representing a partial/fragmented object. NIE 1010 can also ask specific vehicles for retransmissions to fetch the missing subtrees, if there are any.

Finally, NIE 1010 calculates a joint confidence score for the reconstructed octree based on the received confidence scores (as discussed in section B.2). If the joint confidence score exceeds a user defined threshold, NIE 1010 uses the reconstructed octree to update HD map 1322 and pushes the update to vehicles 1002-1006 and oncoming vehicle 1008.

In some cases, there may be no NIE in the vicinity (e.g., for cars, in areas with low or no network coverage) to provide a centralized network for coordinating the collection of observations of the vehicles to update the HD map. In order to account for such scenarios, multiple decentralized network schemes are included to provide accurate and real-time HD feature mapping to use in autonomous driving systems. In some of these schemes, one of the vehicles in the vicinity may take responsibility of coordinating the update efforts and updating server/cloud once an NIE is accessible.

A first of these decentralized schemes may include a mechanism based on a gossip network framework. A gossip-based network is a type of communication protocol that is used for large scale distributed system. Gossip protocol involves periodic message exchange between random set of node pairs (i.e., pair of agents/vehicles). This eventually results in information being spread throughout the system similar to human gossiping. Gossip protocols cope very well in ad-hoc networks such as those encountered with a random collection of vehicles with node churning, i.e. vehicles moving away from and joining the ad-hoc network. By leveraging V2V communications between vehicles, a gossip-inspired protocol can be used to jointly minimize infrastructure bandwidth and feature estimation error. The average number of peer-to-peer messages needed per user for the estimation error (E) for a feature (or the estimation error for updating a feature) may be depicted in the following equation:

$$\mathbb{E}[M] \propto \frac{R^2 \cdot \log(\varepsilon^{-1})}{r^2 \cdot N \cdot P_{tavg}},$$

where $R^2$ is the area of the geographic region of interest, r is the radius of the maximum communication range of a user, N is the number of users in the region of interest, and $P_{tavg} \in [0,1]$ is a measure of the average level of trust between all users. For example, in a 500 m by 500 m region of interest (R=500), with a maximum communication distance of 50 m (r=50), 200 users (N=200), and an average trust of 0.8 ($P_{tavg}$=0.8), only ~1.25 messages per user are needed to achieve an error rate of <1% and ~1.9 messages per user to achieve an error rate of <0.1%.

In some aspects, a decentralized scheme based on a combination of a gossip-protocol and in-network computing technique to update features on an HD map is provided. Each vehicle/agent can utilize its computing power to implement an in-network function which transforms received octree subsets into its own coordinate system, then it may merge it with its own or previously received subset, and finally calculates joint confidence score.

Figure 14:
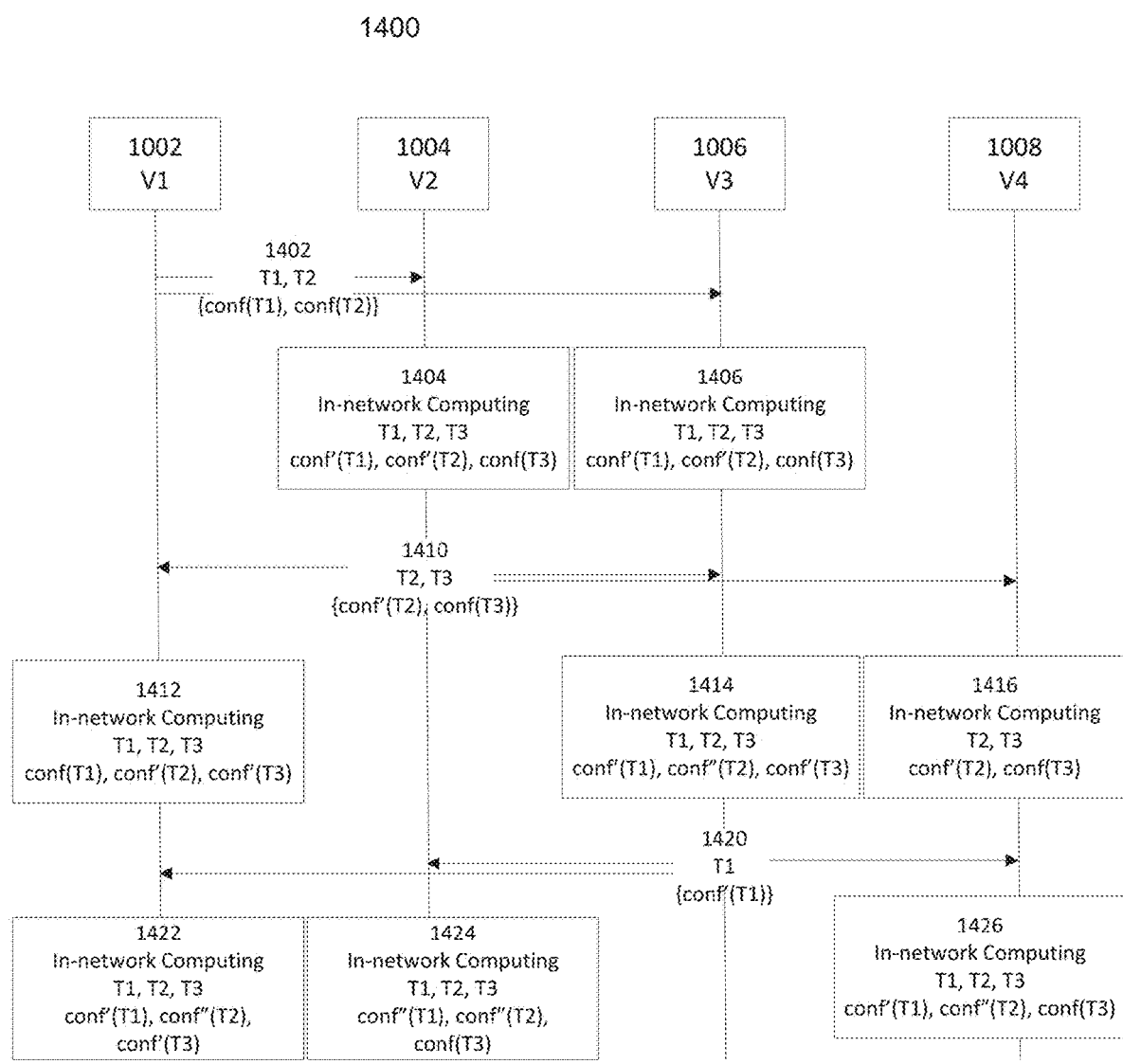

FIG. 14 shows an exemplary MSC 1400 illustrating a method to update a feature map (i.e. HD feature map, HD map) in a decentralized network based on a gossip protocol according to some aspects.

Each vehicle may rely on a periodic V2X Broadcast Safety Message (BSM) or periodic neighbor discovery message to count how many vehicles (i.e. agents or nodes) are present within its vicinity. A vehicle, $V_i$ may have a pre-configured percentage number, $X_{Vi}$ to indicate the fraction of octree subsets it can share with the neighboring agents. It may also have a probability, $P_{Vi}^{gossip}$, to determine how likely it is to gossip with the neighbors. The probability, $P_{Vi}^{gossip}$, can be chosen based on a number of attributes, for example: (i) node density in the neighborhood calculated via neighbor discovery procedure, (ii) confidence score in detecting an object, (iii) average link quality with the neighboring nodes, (iv) computing power, (v) closeness to the boundary of desired area, etc. For example, in an area with a high density, fewer vehicles are likely to gossip but vehicles with more computing power, higher confidence score, and better link quality with the neighbors will have higher probability to gossip.

Upon detection of a dynamic object (e.g., an obstacle, another vehicle, etc.), a vehicle, $V_i$ determines whether it needs to broadcast based on its calculated $P_{Vi}^{gossip}$. If it does, it selects $X_{Vi}$ percentage of octree subsets and broadcasts. The message may include octree subset(s), associated confidence score(s), and/or a desired area to contain the gossiping.

Upon reception of an octree subset, a vehicle uses in-network computing capability to merge the received subset with the already stored octree. It also calculates and updates confidence score(s) for the newly received subset(s). Finally, each vehicle may merge the new octree (subsets) together with the associate updated confidence score and store them. This may continue for multiple rounds of gossiping in which each vehicle again recalculates their gossiping probabilities based on their updated octree subsets plus confidence scores.

MSC 1400 shows an exemplary exchange of messages and in-network, vehicle-based computing illustrating the above principles. The scenario shown in FIG. 10 is used as a basis for MSC 1400; however, in this case, there is no NIE 1010 that is accessible. Additionally, it is assumed that $X_{Vi}=67\%$ and $P_{Vi}^{gossip}=1$ for purposes of simplifying the explanation.

In 1402, vehicle 1002 may broadcast its subtrees based on a percentage of octree subsets of a detected object and the corresponding confidence scores. Vehicles 1004-1006 may receive the broadcast and perform in-network computing 1404-1406 (respectively) based on the message 1402 broadcasted from vehicle 1402. Each of vehicles 1004-1006 may merge the subtrees (or portions thereof) to its own subtree for a more complete octree representation of one or more detected objects. Vehicle 1004 may then broadcast its own subtrees in 1410, which may in part be based on its updated subtrees based on the calculations performed in 1404. The other vehicles, this time 1002, 1006, and 1008, may receive this broadcast and perform in-network computing 1412-1416 based on the broadcast from 1004 and their own respective subtree sets to update their own octree set depicting the representation of their own respective environments, including any potential new dynamic objects. One or more similar rounds of broadcasting from a vehicle to the other vehicles followed by in-network computing by each receiving vehicle to update its subtrees may be performed, e.g., as shown in 1420 and 1422-1426.

One of the consequences of the gossip-based exchange of information shown above may be a loner latency of message delivery. To account for this consequence in decentralized networks, an alternative cluster-based protocol may be followed instead. It is appreciated that depending on the specific scenario, one protocol (i.e. gossip vs cluster-based) may be favorable over the other. For example, in a high agent density area, the gossip-based schemes may provide better results.

In some aspects, the devices and methods of this disclosure may employ a cluster-based method where one vehicle within a configurable geo-area is designated as the coordinator/aggregator/consensus-checker, i.e. "master device" or "clusterhead." This vehicle will collect information, aggregate them, assign joint confidence score based on a consensus algorithm, and also communicate with nearby cluster heads to propagate the information.

The presence of a coordinator and/or aggregator such as an NIE has significant advantages over a completely decentralized dynamic HD map harvesting methods in terms of reducing communication overhead, improving harvesting time, keeping track of trust scores of vehicles, etc., in a centralized manner. However, deployment of infrastructure with a large area of coverage may not be practical for one or more reasons, e.g., due to the cost, low network participation for a given area, etc. Accordingly, a cluster-based architecture can provide a majority of the benefits of an infrastructure-based network without the need for physical NIEs or in the absence of NIEs. Clustering forms a hierarchical network structure in a distributed manner.

According to some aspects, the clustering mechanisms provide several criteria for determining cluster membership. These may include: the proximity of a node to a clusterhead, the category or class of content member agents/nodes are interested in, the geographic location of nodes, performance characteristics, mobility characteristics, sensitivity of content accessed, physical or legal ownership of nodes (the actual criteria may be open ended), among others. Establishing membership may involve a registration step where the relevant criteria are established (such as through an onboarding, attestation, or challenge-response protocol) and where a credential, token, or certificate is issued containing the membership name and status. In some aspects, a group key may be used to establish membership. Alternatively, group memberships may be added to a certificate or token that otherwise identifies the agent (e.g., vehicle) individually.

Cluster member nodes may participate in a cluster as members by authenticating packets using a certificate or group signing or media access control (MAC) key. Another option involves using a token value that accompanies the packet in a packet field that is signed by a group manager, which could be a clusterhead or other similar node.

In some aspects, becoming a clusterhead may be an additional role or privilege that can be granted to cluster member nodes. An existing cluster member may be authorized to manage addition and/or deletion of cluster members. Cluster membership management may be another role that a certificate or token may be granted using the mechanisms described above. A well-known membership management may be established initially to begin a decentralized network deployment. The node in charge of membership management (e.g., clusterhead) may authorize a second membership management node through delegation and so forth until there are enough membership management nodes to accommodate the network. Membership management nodes may also grant clusterhead privileges as described herein. A cluster membership management node may double as a clusterhead node when performance and convenience motivate or require it.

In a complex network including of multiple clusterhead nodes and membership communities, inter-cluster interactions may be authorized by enrolling nodes into multiple clusters as first class members. The node may ensure the packet can traverse multiple clusters by signing multiple times (with keys associated with the expected clusters to be traversed) or by listing the multiple cluster memberships in a certificate or token that is signed by a common trust authority. The clusterhead may allow nodes from peer clusters by authoring a policy that recognizes peer clusters and where verification logic allows nodes authenticated to a peer cluster. Cluster policy may also allow anonymous nodes which may avoid unnecessary signature checks. In general, any number of techniques for handling security in a cluster network may be employed.

In some aspects, a clusterhead may serve the role of coordinator and/or aggregator for the cluster members acting, and, in effect, act like an NIE as described in other aspects of this disclosure (e.g., as explained in FIGS. 10, 12-13). Moreover, the clusterheads may establish inter-cluster coordination to further optimize efficiency of dynamic map harvesting by expanding coordination to a larger Geo-Area. For example, proximate (i.e., close to one another, e.g., next to each other) clusterheads may communicate with each other for inter-cluster coordination. In some cases, where clusterheads of two neighboring clusters cannot reach each other by direct communication, the clusterheads designates one or more cluster members in their clusters as gateway members (GM) to enable inter-cluster coordination, e.g., cluster members closest to the neighboring cluster. Clusterheads also help to send the map update to NIEs or the cloud through inter-clusterhead communication.

In some aspects, in order to form the clusters, messages between nodes (i.e., vehicles or agents) may include computational capabilities required for aggregating and/or coordinating the harvesting of nodes as an additional factor along with other factors, such as communication capability, location, number of reachable neighbors, etc., as criteria that should be used to select a clusterhead during the cluster forming and maintaining process. For example, a node with higher computational capabilities and/or resources may have a higher likelihood to be selected as a clusterhead. Other key performance indicators (KPIs) such as lower cluster formation time, longer clusterhead lifetime, and longer residence times of cluster members (i.e., lower rates of re-affiliation of nodes) under all mobility models may also be considered to get a stable clustering.

For example, the cluster forming process may include at least two steps. The first may be directed at initial clustering which focuses on faster cluster formation to immediately initiate harvesting, and the second step may focus on optimizing cluster head selection for multiple KPIs such as clusterhead life time, computational capability of the clusterhead, etc. The second of these two steps may take place frequently after the initial first step. Once clusterheads are selected, they may start taking the role similar to that of NIE described in the centralized network approaches described herein.

The first step for clustering may include a vehicle (arriving first or in need of initiating/joining cluster) listening and/or monitoring for any existing discovery signal such as a synchronization, a beacon, a "Hello" message, among others, in the proximity for a minimum specified time. This time should be greater than periodicity of the discovery signal such as the synchronization, the beacon, or the "Hello" message. If a discovery signal exists, the vehicle may join the existing cluster, which may include synchronizing, initial access, achieve an identification (ID), etc. If no discovery signal exists, the vehicle may assume the role of a clusterhead and start transmitting a discovery signal.

The second step is performed once an initial cluster is created. The initial clusterhead collects and coordinates to evaluate optimal clusterhead candidates from the cluster member of its cluster. If the optimal clusterhead candidate is determined to be another cluster member, then the initial clusterhead performs a handover of its clusterhead role to the selected best clusterhead candidate.

Figure 15:
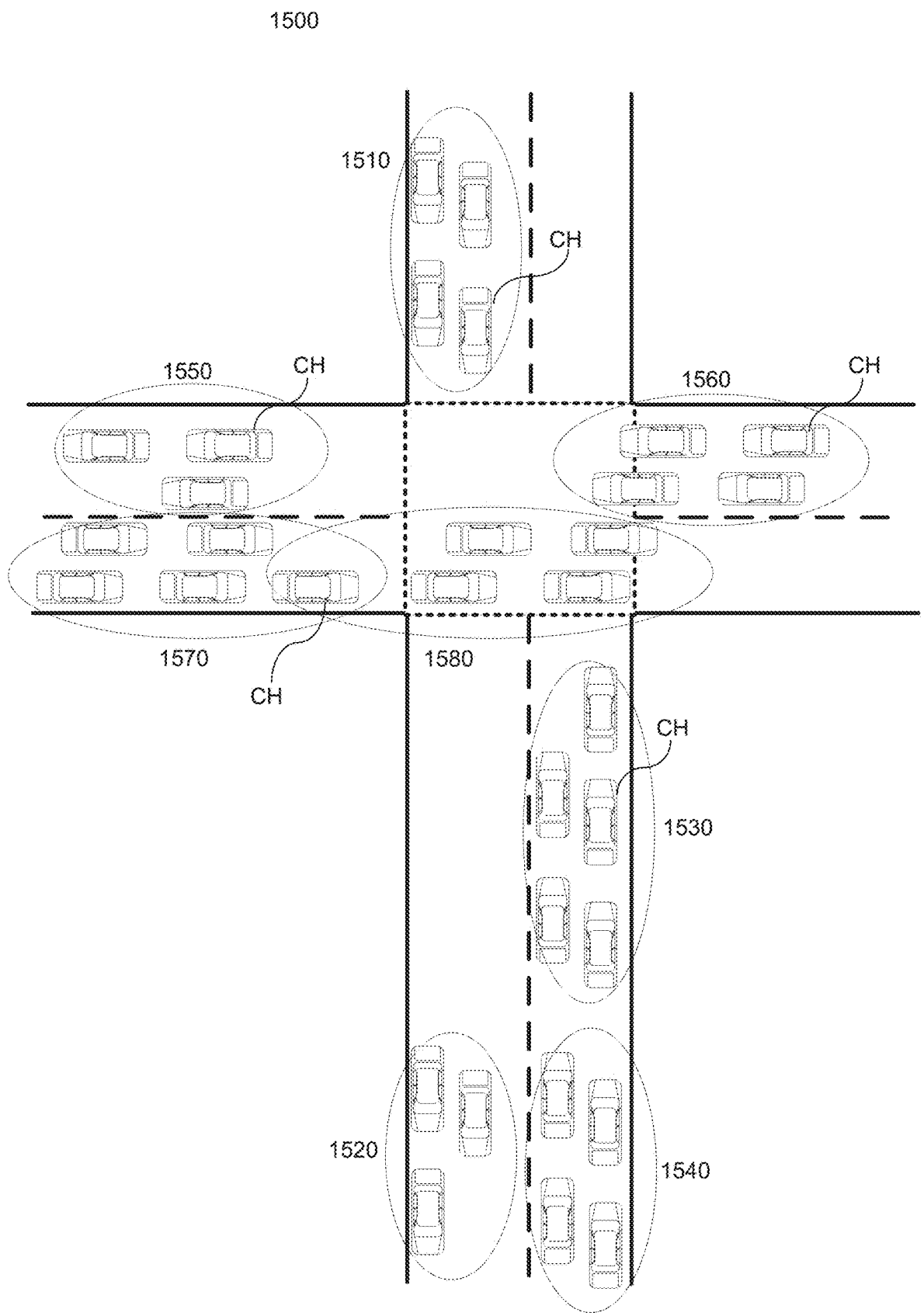
FIG. 15 shows an exemplary cluster-based network according to some aspects.

FIG. 15 shows an exemplary cluster-based network 1500 which may be formed according to the methods described above. Each of vehicle clusters 1510-1580 may have its own clusterhead (CH) which may be selected according to one of the manners described above. In some cases, a same vehicle may be selected to be the clusterhead of two clusters, e.g., for clusters 1570-1580. This may further facilitate the sharing of information between clusters.

FIG. 16 shows an exemplary flowchart 1600 detailing a method for a vehicle to communicate features it observes about its environment to assist in building a map (i.e., HD map, feature map, HD feature map, or the like) for use in vehicle navigation control according to some aspects. It is appreciated that flowchart 1600 may be simplified for purposes of this explanation.

The method of flowchart 1600 may include: receiving a communication from another device, where the communication includes a global reference coordinate system for an area covered by the other device and a number of allowed transmissions to be sent from the vehicle 1602; transforming stored data about the vehicle's environment based on the global reference coordinate system 1604; dividing the transformed stored data into a plurality of subsets of data 1606; and selecting one or more subsets of data from the plurality of subsets for transmission according to the number of allowed transmissions 1608. The method may further include collecting data about the vehicle's environment to store as the stored data; and transmitting the one or more selected subsets according to the number of allowed transmissions. The collecting of data in may correspond to an octree representation of the data, from a vehicle's perspective, acquired by the vehicle's data acquisition device(s). Each respective subset of data may correspond to a subtree as described herein, e.g., with respect to FIGS. 11-14. The global reference coordinate system may be based on a geographic coordinate system such as GPS and may be used to define spatial arrangements of objects, including the vehicles, with respect to one another.

Figure 17:
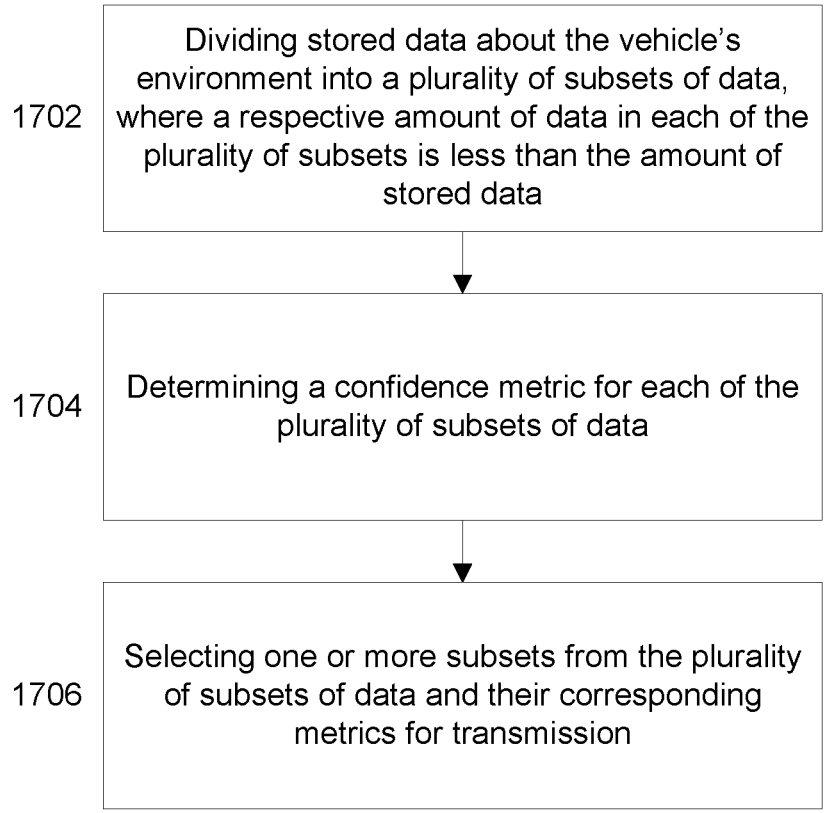

FIG. 17 shows an exemplary flowchart 1700 describing a gossip protocol-based method for updating a map within a de-centralized network according to some aspects. It is appreciated that flowchart 1700 may be simplified for purposes of this explanation.

The method of flowchart 1700 may include: dividing stored data about the vehicle's environment into a plurality of subsets of data, where a respective amount of data in each of the plurality of subsets is less than the collected data 1702; determining a confidence metric for each of the plurality of subsets of data 1704; and selecting one or more subsets from the plurality of subsets of data and their corresponding confidence metrics for transmission 1706. The method may further include the vehicle collecting data about the vehicle's environment and storing it as the stored data; and the vehicle communicating the selected one or more subsets and a corresponding confidence metric for each of the selected one or more subsets. The collecting of data in may correspond to an octree representation of the data, from a vehicle's perspective, acquired by the vehicle's data acquisition device(s), where each respective subset of data may correspond to a subtree as described herein, e.g., with respect to FIGS. 11-14.

FIG. 18 shows an exemplary flowchart 1800 describing a cluster-based method for updating a map within a de-centralized network according to some aspects. It is appreciated that flowchart 1800 may be simplified for purposes of this explanation.

The method of flowchart 1800 may include: receiving a communication from the clusterhead, where the communication includes a global reference coordinate system for an area covered by the clusterhead and a number of allowed transmissions to be sent from the vehicle 1802; transforming stored data about the vehicle's environment based on the global reference coordinate system 1804; dividing the transformed stored data into a plurality of subsets of data; and selecting one or more subsets of data from the plurality of subsets for transmission according to the number of allowed transmissions to at least one other vehicle in the group of vehicles 1808. The method may further include the vehicle collecting data about the vehicle's environment and storing it as the stored data; and the vehicle transmitting the one or more subsets to the at least one other vehicle. The collecting of data in may correspond to an octree representation of the data, from a vehicle's perspective, acquired by the vehicle's data acquisition device(s), where each respective subset of data may correspond to a subtree as described herein, e.g., with respect to FIGS. 11-14.

Figure 19:
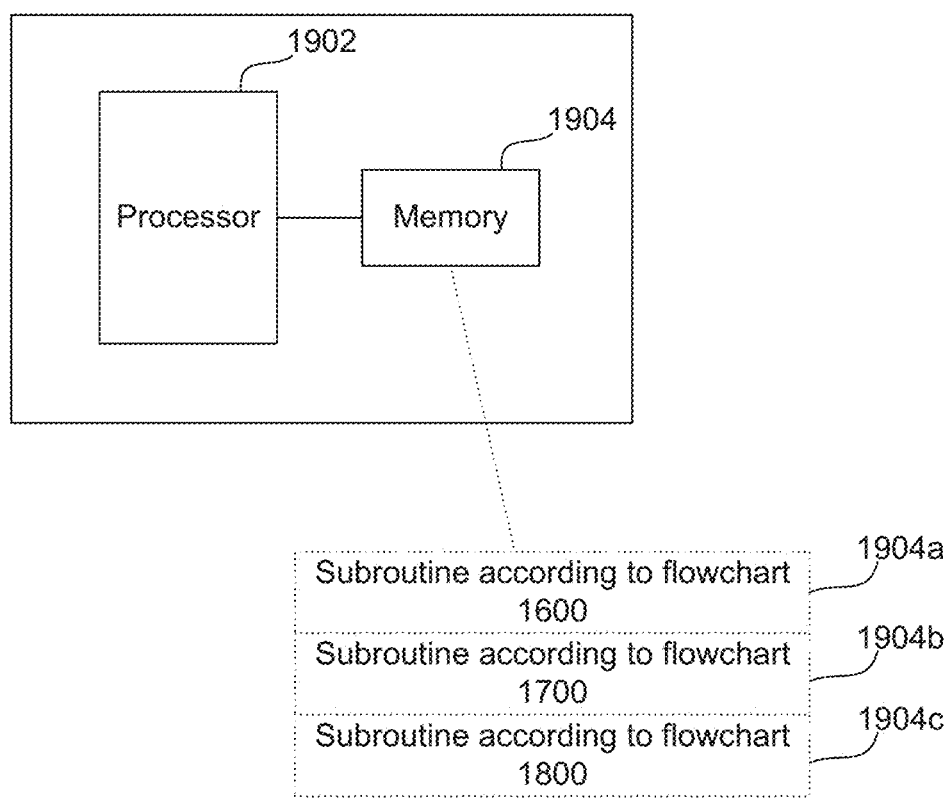
FIG. 19 shows an exemplary internal configuration of a device according to some aspects.

FIG. 19 shows an exemplary internal configuration of a device 1900 according to some aspects. As shown in FIG. 19, device 1900 may include processor 1902 and memory 1904. Processor 1902 may be a single processor or multiple processors, and may be configured to retrieve and execute program code to perform the transmission and reception, channel resource allocation, and cluster management as described herein. Processor 1902 may transmit and receive data over a software-level connection that is physically transmitted as wireless radio signals by radio frequency equipment. Memory 1904 may be a non-transitory computer readable medium storing instructions for one or more of: in 1904a, a subroutine for executing a method according to flowchart 1600; in subroutine 1904b, a subroutine for executing a method according to flowchart 1700, and/or in subroutine 1904c, a subroutine for executing a method according to flowchart 1800. Furthermore, each of subroutines 1904a-1904c may include additional instructions for implementing any of the methods described herein.

In the following, various aspects of the present disclosure will be illustrated:

In Example 1, a method for a vehicle to communicate features about its environment, the method including: estimating a number of other vehicles competing for an available bandwidth; dividing stored data about the vehicle's environment into a plurality of subsets of data based on the number of other vehicles and the available bandwidth, where a respective amount of data in each of the plurality of subsets is less than the amount of stored data; selecting one or more subsets of data from the plurality of subsets; and transmitting the one or more selected subsets. The stored data about the vehicle's environment may be collected from one or more data acquisition devices of the vehicle. The method may further include transmitting the one or more selected subsets.

In Example 2, the subject matter of Example(s) 1 may include the one or more selected subsets providing information for the construction and/or updating of a map for use in vehicular navigation control.

In Example 3, the subject matter of Example(s) 1-2 may include the stored data including data collected from one or more of the vehicle's data acquisition devices.

In Example 4, the subject matter of Example(s) 3 may include the vehicle's data acquisition devices including one or more of an image acquisition device, a proximity detector, or acoustic sensor.

In Example 5, the subject matter of Example(s) 4 may include the one or more image acquisition devices including at least one of a camera or a charge coupling device.

In Example 6, the subject matter of Example(s) 4-5 may include the one or more proximity detectors including at least one of a radar sensor, a light detection and ranging (LIDAR) sensor, or a mmWave radar sensor.

In Example 7, the subject matter of Example(s) 4-6 may include the one or more acoustic sensors including at least one of a microphone, sonar sensor, or ultrasonic sensor.

In Example 8, the subject matter of Example(s) 1-7 may include tagging the stored data with metadata. The metadata may include at least one of temporal or location metadata.

In Example 9, the subject matter of Example(s) 8 may include the temporal metadata including a timestamp.

In Example 10, the subject matter of Example(s) 8-9 may include the location metadata including GNSS or GPS coordinates.

In Example 11, the subject matter of Example(s) 1-10 may include that estimating the number of vehicles competing for an available bandwidth is in an area around the vehicle. This area may be defined by a range in which the vehicle may perform RF communications with other devices (e.g., other vehicles, an NIE) or be defined by an NIE coverage area.

In Example 12, the subject matter of Example(s) 1-11 may include that estimating the number of other vehicles is performed passively or actively.

In Example 13, the subject matter of Example(s) 1-11 may include that estimating the number of other vehicles includes transmitting a query to a network infrastructure element and receiving a response with information for estimating the number of other vehicles competing for an available bandwidth. This may include a numerical value or range of the total number of vehicles in the NIE's coverage area.

In Example 14, the subject matter of Example(s) 1-11 may include that estimating the number of other vehicles includes transmitting a query to at least one of the other vehicles and receiving a response with information for estimating the number of other vehicles competing for an available bandwidth. This may include a numerical value or range of the total number of vehicles in the NIE's coverage area.

In Example 15, the subject matter of Example(s) 1-11 may include that estimating the number of other vehicles includes the vehicle estimating the number of other vehicles based on at least one of a token, node area density, communication channel status, or the collected data about the vehicle's environment. For example, the communication channel status may be the level of interference.

In Example 16, the subject matter of Example(s) 1-15 may include that determining the available bandwidth is based on a RAT used by the vehicle and/or an area in which the vehicle is located.

In Example 17, the subject matter of Example(s) 1-16 may include that the selection of the one or more subsets is random.

In Example 18, the subject matter of Example(s) 1-17 may include ranking the stored data depending on a type of feature.

In Example 19, the subject matter of Example(s) 18 may include increasing a likelihood of selecting one or more subsets including higher ranked identified features for transmission.

In Example 20, the subject matter of Example(s) 1-19 may include ranking the collected data based on the metadata.

In Example 21, a method for authenticating features reported by a vehicle, the method including: receiving, from a network, a map of an area with confidence weights corresponding to each feature on the map and/or a list of trusted users; upon the vehicle entering the area, checking to see whether the vehicle is on the list of trusted users; and checking features reported from the vehicle and matching the features to the map of the area. A user trust score for the vehicle is created based on the feature reported from the vehicle and the confidence weights corresponding to the feature. The area may be a coverage area of an NIE.

In Example 22, the subject matter of Example(s) 21 may include, based on the vehicle not being on the list of trusted users, establishing a user trust score for the vehicle by performing multiple checks on features reported from the vehicle.

In Example 23, the subject matter of Example(s) 22 may include comparing the user trust score to a threshold.

In Example 24, the subject matter of Example(s) 23 may include, based on the user trust score being greater than the threshold, adding the vehicle to the list of trusted users.

In Example 25, the subject matter of Example(s) 23 may include, based on the user trust score being less than the threshold, flagging the vehicle as an untrusted user.

In Example 26, the subject matter of Example(s) 21-25 may include checking the features reported from the vehicle with those reported from a second vehicle.

In Example 27, the subject matter of Example(s) 26 may include that the second vehicle is on the list of trusted users.

In Example 28, the subject matter of Example(s) 26 may include that the user trust score from each of the vehicle and the second vehicle are utilized in checking respectively reported features.

In Example 29, the subject matter of Example(s) 21-28 may include that the checking of the features is performed by a network infrastructure element.

In Example 30, one or more non-transitory computer readable media including programmable instructions thereon, that when executed by one or more processors of a device, cause the device to perform any one of the method of Examples 1-29.

In Example 31, a communication device for a vehicle to communicate features about its environment, the device including one or more processors configured to: estimate a number of other vehicles in competing for an available bandwidth; divide stored data about the vehicle's environment into a plurality of subsets of data based on the number of other vehicles and the available bandwidth, where a respective amount of data in each of the plurality of subsets is less than the amount of stored data; and select one or more subsets of data from the plurality of subsets for transmission. The one or more processors may be configured to store the data about the vehicle's environment after it is collected from one or more data acquisition devices. The one or more processors may be coupled to an RF transceiver configured to transmit the one or more selected subsets.

In Example 32, the subject matter of Example(s) 31 may include that the one or more selected subsets provide information for the construction and/or updating of a map for use in vehicular navigation control.

In Example 33, the subject matter of Example(s) 31-32 may include that the stored data includes data collected from one or more of the vehicle's data acquisition devices.

In Example 34, the subject matter of Example(s) 33 may include that the vehicle's data acquisition devices includes one or more of an image acquisition device, a proximity detector, or acoustic sensor.

In Example 35, the subject matter of Example(s) 34 may include that the one or more image acquisition devices include at least one of a camera or a charge coupling device.

In Example 36, the subject matter of Example(s) 34-35 may include that the one or more proximity detectors include at least one of a radar sensor, a light detection and ranging (LIDAR) sensor, or a mmWave radar sensor.

In Example 37, the subject matter of Example(s) 34-36 may include that the one or more acoustic sensors include at least one of a microphone, sonar sensor, or ultrasonic sensor.

In Example 38, the subject matter of Example(s) 31-37 may include the one or more processors configured to tag the stored data with metadata. The metadata may include at least one of temporal or location metadata.

In Example 39, the subject matter of Example(s) 38 may include that the temporal metadata includes a timestamp.

In Example 40, the subject matter of Example(s) 38-39 may include that the location metadata includes GNSS or GPS coordinates.

In Example 41, the subject matter of Example(s) 31-40 may include that estimating the number of vehicles is in an area around the vehicle. This area may be defined by a range in which the vehicle may perform RF communications with other devices (e.g., other vehicles, an NIE) or be defined by an NIE coverage area.

In Example 42, the subject matter of Example(s) 31-41 may include that estimating the number of other vehicles includes passively or actively estimating the number of other vehicles.

In Example 43, the subject matter of Example(s) 31-41 may include that estimating the number of other vehicles includes transmitting a query to a network infrastructure element and receiving a response with information for estimating the number of other vehicles competing for an available bandwidth.

In Example 44, the subject matter of Example(s) 31-41 may include that estimating the number of other vehicles includes transmitting a query to at least one of the other vehicles and receiving a response with information for estimating the number of other vehicles competing for an available bandwidth.

In Example 45, the subject matter of Example(s) 31-41 may include that estimating the number of other vehicles includes the vehicle estimating the number of other vehicles based on at least one of a token, node area density, communication channel status, or the collected data about the vehicle's environment.

In Example 46, the subject matter of Example(s) 31-45 may include that determining the available bandwidth is based on a RAT used by the vehicle and/or an area in which the vehicle is located.

In Example 47, the subject matter of Example(s) 31-46 may include that the selection of the one or more subsets is random.

In Example 48, the subject matter of Example(s) 31-47 may include the one or more processors further configured to rank the stored data depending on an identified type of feature.

In Example 49, the subject matter of Example(s) 48 may include the one or more processors further configured to increase a likelihood of selecting one or more subsets including higher ranked features of the collected data for transmission.

In Example 50, the subject matter of Example(s) 31-49 may include the one or more processors further configured to rank the stored data based on the metadata.

In Example 51, a communication device including means to: estimate a number of other vehicles competing for an available bandwidth; divide stored data about the vehicle's environment into a plurality of subsets of data based on the number of other vehicles and the available bandwidth, where a respective amount of data in each of the plurality of subsets is less than the amount of stored data; select one or more subsets of data from the plurality of subsets for transmission. The communication device may further include means to collect data about the vehicle's environment and means to transmit the one or more selected subsets.

In Example 52, a system including one or more devices according to any of Examples 31-51, the system configured to implement a method according to any of Examples 1-29.

In Example 53, a method for a vehicle to communicate features about its environment, the method including: receiving a communication from another device, where the communication includes a global reference coordinate system for an area covered by the other device and a number of allowed transmissions to be sent from the vehicle; transforming stored data about the vehicle's environment based on the global reference coordinate system; dividing the transformed stored data into a plurality of subsets of data; and selecting one or more subsets of data from the plurality of subsets for transmission according to the allowed transmission. The method may also include collecting data about the vehicle's environment and storing it as the stored data. The method may further include transmitting the one or more selected subsets according to the number of allowed transmissions.

In Example 54, the subject matter of Example(s) 53 may include that the one or more selected subsets provide information for the construction and/or updating of a map for use in vehicular navigation control.

In Example 55, the subject matter of Example(s) 53-54 may include starting a timer of a random duration upon receiving the communication from the other device.

In Example 56, the subject matter of Example(s) 55 may include transmitting the one or more selected subsets according to the number of allowed transmissions upon expiration of the timer.

In Example 57, the subject matter of Example(s) 53-56 may include determining a confidence metric for each of the plurality of subsets of data.

In Example 58, the subject matter of Example(s) 57 may include that the confidence metric is based on one or more of the following: a distance between the vehicle and a detected feature corresponding to the respective subset of data from the plurality of subsets of data, a relative position to the detected feature, a LoS or vantage point to the detected feature, and/or a grade of a sensor and/or detector reporting the feature.

In Example 59, the subject matter of Example(s) 57-58 may include including the confidence metric for the respective subset of data with the transmission of the one or more selected subsets.

In Example 60, the subject matter of Example(s) 53-59 may include receiving, from the other device, a range of data to include in the transmitting of the one or more selected subsets according to the number of allowed transmissions.

In Example 61, the subject matter of Example(s) 60 may include that the range include a minimum greater than 0% the collected data and a maximum less than 100% of the collected data.

In Example 62, the subject matter of Example(s) 53-61 may include that the other device receives the one or more selected subsets from a plurality of vehicles, including the vehicle, and updates a map for use in vehicular navigation control.

In Example 63, the subject matter of Example(s) 62 may include that the other device allocates a weight to the respective one or more selected subsets based on its corresponding confidence metric in determining an update to the map.

In Example 64, the subject matter of Example(s) 62-63 may include that the other device communicates the updated map to one or more vehicles.

In Example 65, the subject matter of Example(s) 53-64 may include that the other device is a network infrastructure element.

In Example 66, the subject matter of Example(s) 53-64 may include that the other device is another vehicle.

In Example 67, a method for a vehicle to communicate features about its environment to one or more neighboring vehicles, the method including: dividing stored data about the vehicle's environment into a plurality of subsets of data, where a respective amount of data in each of the plurality of subsets is less than the amount of stored data; determining a confidence metric for each of the plurality of subsets of data; and selecting one or more subsets from the plurality of subsets of data and their corresponding confidence metrics for transmission. The method may further include collecting data about the vehicle's environment and storing it as the stored data, and communicating the one or more selected subsets and their corresponding confidence metrics.

In Example 68, the subject matter of Example(s) 67 may include receiving one or more subsets of data and corresponding confidence metrics from one or more of the neighboring vehicles.

In Example 69, the subject matter of Example(s) 68 may include updating a map based on the vehicle's own collected data and the received one or more subsets of data and corresponding confidence metrics from the one or more of the neighboring vehicles.

In Example 70, a method for a vehicle to communicate features about its environment with a group of vehicles including a clusterhead, the method including: receiving a communication from the clusterhead, where the communication includes rises a global reference coordinate system for an area covered by the clusterhead and a number of allowed transmissions to be sent from the vehicle; transforming stored data about the vehicle's environment based on the global reference coordinate system; dividing the transformed stored data into a plurality of subsets of data; and selecting one or more subsets of data from the plurality of subsets and their corresponding confidence metrics for transmission. The method may further include collecting data about the vehicle's environment and storing it as the stored data, and communicating the one or more selected subsets and their corresponding confidence metrics In Example 71, the subject matter of Example(s) 71 may include that the clusterhead of the group of vehicles is configured to communicate with entities external to the group including one or more of at least another clusterhead of another group or a network infrastructure element.

In Example 72, one or more non-transitory computer readable media including programmable instructions thereon, that when executed by one or more processors of a device, cause the device to perform any one of the method of Examples 53-71.

In Example 73, a communication device for a vehicle to communicate features about its environment, the device including one or more processors configured to: receive a communication from another device, where the communication includes a global reference coordinate system for an area covered by the other device and a number of allowed transmissions to be sent from the vehicle; transform stored data about the vehicle's environment based on the global reference coordinate system; divide the transformed stored data into a plurality of subsets of data; and select one or more subsets of data from the plurality of subsets for transmission.

The communication device may also include components to acquire data about the vehicle's environment, e.g. one or more data acquisition devices. The one or more processors may receive the communication from the other device via an RF transceiver of the vehicle. The communication device may further transmit the one or more selected subsets according to the number of allowed transmissions via the RF transceiver and an antenna of the vehicle.

In Example 74, the subject matter of Example(s) 73 may include that the one or more selected subsets provide information for the construction and/or updating of a map for use in vehicular navigation control.

In Example 75, the subject matter of Example(s) 73-74 may include the one or more processors further configured to start a timer of a random duration upon receiving the communication from the other device.

In Example 76, the subject matter of Example(s) 75 may include the one or more processors further configured to transmit the one or more selected subsets according to the number of allowed transmissions upon expiration of the timer.

In Example 77, the subject matter of Example(s) 73-76 may include the one or more processors further configured to determine a confidence metric for each of the plurality of subsets of data.

In Example 78, the subject matter of Example(s) 77 may include that the confidence metric is based on one or more of the following: a distance between the vehicle and a detected feature corresponding to the respective subset of data from the plurality of subsets of data, a relative position to the detected feature, a LoS or vantage point to the detected feature, and/or a grade of a sensor and/or detector reporting the feature.

In Example 79, the subject matter of Example(s) 77-78 may include the one or more processors further configured to include the confidence metric for the respective subset of data with the transmission of the one or more selected subsets.

In Example 80, the subject matter of Example(s) 73-79 may include the one or more processors further configured to receive, from the other device, a range of data to include in the transmitting of the one or more selected subsets according to the number of allowed transmissions.

In Example 81, the subject matter of Example(s) 80 may include that the range include a minimum greater than 0% the collected data and a maximum less than 100% of the collected data.

In Example 82, the subject matter of Example(s) 73-81 may include that the other device receives the one or more selected subsets from a plurality of vehicles, including the vehicle, and updates a map for use in vehicular navigation control.

In Example 83, the subject matter of Example(s) 82 may include that the other device allocates a weight to the respective one or more selected subsets based on its corresponding confidence metric in determining an update to the map.

In Example 84, the subject matter of Example(s) 82-83 may include that the other device communicates the updated map to one or more vehicles.

In Example 85, the subject matter of Example(s) 73-84 may include that the other device is a network infrastructure element.

In Example 86, the subject matter of Example(s) 73-84 may include that the other device is another vehicle.

In Example 87, a communication device for a vehicle to communicate features about its environment to one or more neighboring vehicles, the device including one or more processors configured to: collect data about the vehicle's environment; divide the collected data into a plurality of subsets of data, where a respective amount of data in each of the plurality of subsets is less than the collected data; determine a confidence metric for each of the plurality of subsets of data and select one or more subsets from the plurality of subsets of data; and communicate the selected one or more subsets and a corresponding confidence metric for each of the selected one or more subsets.

In Example 88, the subject matter of Example(s) 87 may include the one or more processors further configured to receive one or more subsets of data and corresponding confidence metrics from one or more of the neighboring vehicles.

In Example 89, the subject matter of Example(s) 88 may include the one or more processors further configured to update a map based on the vehicle's own collected data and the received one or more subsets of data and corresponding confidence metrics from the one or more of the neighboring vehicles.

In Example 90, a device including means to: collect data about the vehicle's environment; receive a communication from another device, where the communication includes a global reference coordinate system for an area covered by the other device and a number of allowed transmissions to be sent from the vehicle; transform the collected data based on the global reference coordinate system; divide the transformed collected data into a plurality of subsets of data and select one or more subsets of data from the plurality of subsets; and transmit the one or more selected subsets according to the number of allowed transmissions.

In Example 91, a device including means to: collect data about the vehicle's environment; divide the collected data into a plurality of subsets of data, where a respective amount of data in each of the plurality of subsets is less than the collected data; determine a confidence metric for each of the plurality of subsets of data and select one or more subsets from the plurality of subsets of data; and communicate the selected one or more subsets and a corresponding confidence metric for each of the selected one or more subsets.

In Example 92, a system including one or more devices according to any of Examples 73-91, the system configured to implement a method according to any of Examples 53-71.

It is appreciated that subject matter from other combinations of the above examples fall within the scope of this disclosure, e.g. one or more processors of a communication device may be configured in accordance with the combination of subject matter from Examples 31, 51, 73, and 87.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device.

Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A communication device for a vehicle to communicate features about the vehicle's environment, the communication device comprising one or more processors configured to:
receive a communication from another device, wherein the communication comprises a global reference coordinate system for an area covered by the other device and a number of allowed transmissions to be sent from the vehicle;
transform stored data about the vehicle's environment based on the global reference coordinate system;
divide the transformed stored data into a plurality of subsets of data; and
select one or more subsets of data from the plurality of subsets for transmission according to the number of allowed transmissions.

2. The communication device of claim 1, the one or more processors further configured to start a timer of a random duration upon receiving the communication from the other device.

3. The communication device of claim 2, the one or more processors further configured to transmit the one or more selected subsets according to the number of allowed transmissions upon expiration of the timer.

4. The communication device of claim 1, the one or more processors further configured to determine a confidence metric for each of the plurality of subsets of data.

5. The communication device of claim 4, the one or more processors further configured to include the confidence metric for the respective subset of data with the selection of the one or more selected subsets for transmission.

6. The communication device of claim 1, the one or more processors further configured to receive, from the other device, a range of data to include in the transmitting of the one or more selected subsets according to the number of allowed transmissions.

7. A communication device for a vehicle to communicate features about the vehicle's environment to one or more neighboring vehicles, the communication device including one or more processors configured to:
divide stored data about the vehicle's environment into a plurality of subsets of data, wherein a respective amount of data in each of the plurality of subsets is less than the stored data;
determine a confidence metric for each of the plurality of subsets of data; and
select one or more subsets from the plurality of subsets of data and their corresponding confidence metrics for transmission, wherein the confidence metric is associated with a global reference coordinate system for an area covered by the one or more neighboring vehicles and a number of allowed transmissions to be sent from the vehicle.

8. The communication device of claim 7, the one or more processors further configured to receive one or more subsets of data and their corresponding confidence metrics from one or more of the neighboring vehicles and update a map based on the stored data and the one or more subsets of data and their corresponding confidence metrics received from the one or more of the neighboring vehicles.

9. A non-transitory computer readable medium, comprising instructions which, if executed, cause one or more processors to:
receive a communication from another device, where the communication includes a global reference coordinate system for an area covered by the other device and a number of allowed transmissions to be sent from the vehicle;
transform stored data about the vehicle's environment based on the global reference coordinate system;
divide the transformed stored data into a plurality of subsets of data; and
select one or more subsets of data from the plurality of subsets for transmission according to the allowed transmission.

10. The non-transitory computer readable medium of claim 9, wherein the instructions are further configured to cause the one or more processors to start a timer of a random duration upon receiving the communication from the other device.

11. The non-transitory computer readable medium of claim 10, wherein the instructions are further configured to cause the one or more processors to transmit the one or more selected subsets according to the number of allowed transmissions upon expiration of the timer.

12. The non-transitory computer readable medium of claim 10, wherein the instructions are further configured to cause the one or more processors to determine a confidence metric for each of the plurality of subsets of data.

13. The non-transitory computer readable medium of claim 12, wherein the instructions are further configured to cause the one or more processors to include the confidence metric for the respective subset of data with the selection of the one or more selected subsets for transmission.

14. The non-transitory computer readable medium of claim 9, wherein the instructions are further configured to cause the one or more processors to receive, from the other device, a range of data to include in the transmitting of the one or more selected subsets according to the number of allowed transmissions.

15. A non-transitory computer readable medium, comprising instructions which, if executed, cause one or more processors to:
divide stored data about the vehicle's environment into a plurality of subsets of data, wherein a respective amount of data in each of the plurality of subsets is less than the stored data;
determine a confidence metric for each of the plurality of subsets of data; and
select one or more subsets from the plurality of subsets of data and their corresponding confidence metrics for transmission, wherein the confidence metric is associated with a global reference coordinate system for an area covered by the one or more neighboring vehicles and a number of allowed transmissions to be sent from the vehicle.

16. The non-transitory computer readable medium of claim 15, wherein the instructions are further configured to cause the one or more processors to:
receive one or more subsets of data and their corresponding confidence metrics from one or more neighboring vehicles and update a map based on the stored data and the one or more subsets of data and their corresponding confidence metrics received from the one or the neighboring vehicles.

\* \* \* \* \*